US011958106B2

(12) United States Patent
Yoshimura et al.

(10) Patent No.: US 11,958,106 B2
(45) Date of Patent: Apr. 16, 2024

(54) PLATE HOLDING DEVICE, PLATE DETACHING APPARATUS, PLATE ATTACHING APPARATUS, AND PLATE ATTACHING-DETACHING APPARATUS

(71) Applicant: KROSAKIHARIMA CORPORATION, Fukuoka (JP)

(72) Inventors: Mamoru Yoshimura, Fukuoka (JP); Junichi Funato, Fukuoka (JP); Yusuke Yamaguchi, Fukuoka (JP); Toshihiro Imahase, Fukuoka (JP)

(73) Assignee: KROSAKIHARIMA CORPORATION, Fukuoka (JP)

( * ) Notice: Subject to any disclaimer, the term of this patent is extended or adjusted under 35 U.S.C. 154(b) by 390 days.

(21) Appl. No.: 17/432,193

(22) PCT Filed: Mar. 3, 2020

(86) PCT No.: PCT/JP2020/008857
§ 371 (c)(1),
(2) Date: Aug. 19, 2021

(87) PCT Pub. No.: WO2020/179774
PCT Pub. Date: Sep. 10, 2020

(65) Prior Publication Data
US 2022/0097129 A1 Mar. 31, 2022

(30) Foreign Application Priority Data

Mar. 4, 2019 (JP) .................................. 2019-038779
Mar. 4, 2019 (JP) .................................. 2019-038784
(Continued)

(51) Int. Cl.
*B22D 41/34* (2006.01)
*B22D 41/30* (2006.01)

(52) U.S. Cl.
CPC ............. *B22D 41/34* (2013.01); *B22D 41/30* (2013.01)

(58) Field of Classification Search
CPC ........ B22D 41/24; B22D 41/30; B22D 41/34; B25J 9/1687; B25J 13/08; G05B 2219/40032
See application file for complete search history.

(56) References Cited

U.S. PATENT DOCUMENTS 5,645,793 A * 7/1997 Yamamoto ............. B22D 41/22
222/600
10,799,942 B2 10/2020 Fukunaga et al.

FOREIGN PATENT DOCUMENTS

EP 1894649 A1 * 3/2008 ............. B22D 41/22
JP 49-079325 A 12/1972
(Continued)

OTHER PUBLICATIONS

International Search Report and Written Opinion for PCT/JP2020/008857 filed Mar. 3, 2020.
(Continued)

*Primary Examiner* — Kevin E Yoon
(74) *Attorney, Agent, or Firm* — Paul D. Bianco; Fleit Intellectual Property Law

(57) ABSTRACT

Provided are a plate holding device, a plate detaching apparatus, a plate attaching apparatus and a plate attaching-detaching apparatus which are capable of reliably attaching and/or detaching a plate with respect to a plate-receiving
(Continued)

metal frame. The plate holding device comprises: a plurality of holding members for holding a plate for a sliding nozzle device; widening and narrowing mechanisms to selectively widen and narrow a distance between the holding members; a pressing unit for pressing a central region of the plate when the plate is held by the holding members; and a force sensor for detecting a force received by the holding members and/or the pressing unit from the held plate. The plate holding device is configured to be mounted to a distal end of a robot arm.

12 Claims, 23 Drawing Sheets

(30) Foreign Application Priority Data

Jun. 19, 2019 (JP) .................................. 2019-113968
Jun. 19, 2019 (JP) .................................. 2019-113970

(56) References Cited

FOREIGN PATENT DOCUMENTS

| | | | |
|---|---|---|---|
| JP | 4-66268 | A | 3/1992 |
| JP | 06-190542 | A | 7/1994 |
| JP | 7-132484 | A | 5/1995 |
| JP | 08-039233 | A | 2/1996 |
| JP | 8-39233 | A | 2/1996 |
| JP | 10-263796 | A | 10/1998 |
| JP | 10-323752 | A | 12/1998 |
| JP | 2011-104606 | A | 6/2011 |
| JP | 2013043256 | A * | 3/2013 |
| WO | 2018/074424 | A1 | 4/2018 |

OTHER PUBLICATIONS

English translation of International Preliminary Report dated Aug. 25, 2021 with Written Opinion, for PCT/JP2020/008857 filed Mar. 3, 2020.

* cited by examiner

PLATE HOLDING DEVICE, PLATE DETACHING APPARATUS, PLATE ATTACHING APPARATUS, AND PLATE ATTACHING-DETACHING APPARATUS

Plate holding device, plate detaching apparatus, plate attaching apparatus, and plate attaching-detaching apparatus

TECHNICAL FIELD

The present invention relates to a plate holding device for holding a plate for a sliding nozzle device, and a plate detaching apparatus, a plate attaching apparatus and a plate attaching-detaching apparatus each equipped with the plate holding device.

BACKGROUND ART

A sliding nozzle device for use in continuous casting of molten steel employs two or three refractory plates, each of which is attached to a respective one of two or three plate-receiving metal frames. When these plates reach the end of their life due to wear damage, it is necessary to open the sliding nozzle device to take out the old plates from respective plate-receiving metal frames, and replace the old plates with new ones. This replacement operation imposes a heavy burden on an operator, because it has to be performed under high temperature, and the weight of the plate, particularly heavy ones, is close to 30 kg.

Therefore, with a view to reducing the burden of the plate replacement operation, the present inventors disclosed, in the below-mentioned Patent Document 1, a plate holding device capable of holding a plate in a state in which it is mounted to a balancer or a robot arm, and a plate attaching method using the plate holding device.

Specifically, as shown in FIG. 17, the plate holding device 1 comprises: a parallel gripper (parallel hand) 3 serving as widening and narrowing means; a pair of (two) holding members 4 each attached to a respective one of two parallel claws 31 of the parallel gripper 3; and a pressing unit 5 provided in front of the parallel gripper 3. Further, each of the holding members 4 has two lateral arm portions, wherein an engagement groove 41 is formed at a distal end of each of the lateral arm portions.

As shown in FIGS. 18 and 19, a plate 2 to be held by this plate holding device comprises: a plate body; a metal back plate 203 on the back side of the plate body; a metal band 205 covering a side (peripheral) surface of the plate body; and two plate-shaped fixable portions 209 each extending outwardly from a respective one of longitudinal opposite ends of the back plate 203. Further, the plate is provided with a plate-shaped engagement protrusion 210 extending from the back plate 203 to serve as a to-be-held portion, by a number of two on one side, i.e., by a number of four in total.

The pair of holding members 4 are configured to be moved closer to and away from each other in the longitudinal direction (sliding direction) of the plate 2, according to movement of the parallel gripper 3, and to, when they hold the plate 2, ensure a certain gap between each of the engagement protrusions 210 and a contactable area which is an inner wall surface of a corresponding one of the engagement grooves 41, as shown in FIGS. 19 and 20. More specifically, a gap between the engagement protrusion 210 and a longitudinal-directional contactable area 42 of the engagement groove 41 (a gap in the longitudinal direction of the plate), a gap between the engagement protrusion 210 and a width-directional contactable area 43 of the engagement groove 41 (a gap in a width direction of the plate), and a gap between the engagement protrusion 210 and a thickness-directional contactable area 44 (45) of the engagement groove 41 (a gap in a thickness direction of the plate), are provided, wherein each of the gaps is set to 5 mm on one side. As a result of providing the gaps in the above manner, the plate 2 can move in any direction (in any of the longitudinal, width and thickness directions of the plate) within the range of a corresponding one of the gaps.

The plate 2 is attached to a plate-receiving metal frame 6 of a sliding nozzle device in a state as shown in FIG. 21. When detaching the plate using the plate holding device, the holding members 4 of the plate holding device are inserted into a gap between the plate 2 and the plate-receiving metal frame 6 to perform the plate detaching operation.

Meanwhile, in an iron foundry, the sliding nozzle device is attached to the bottom of a molten steel pot. Thus, when detaching a used plate, the plate assembled to the sliding nozzle device has to be detached from the side of the bottom of the molten steel pot in a state in which the molten steel pot is laid down. In this case, the molten steel pot is laid down by manipulating a crane. However, since the crane is manually manipulated, the laid-down position of the molten steel pot will vary each time.

Thus, in order to perform the plate detaching operation under position control of a robot arm, the position of the sliding nozzle device has to be accurately measured each time. In recent years, measurement of the position of an object during use of the robot arm has been commonly performed, using of a technique of acquiring an image of the object by a camera, and subjecting the acquired image to image processing, thereby correcting positional coordinates of the object. However, with regard to the sliding nozzle device, it has been found that, in the image processing, there is a problem that a measurement accuracy in a front-rear direction (distance) becomes poor, although measurement accuracies in an up-down direction and in a right-left direction are at a practical level.

This is because the image is acquired during a drop in temperature of the sliding nozzle device just after being used at high temperature, so that the size of an image-acquisition reference area of the sliding nozzle device varies each image-acquisition, and thereby an error in positional coordinates, particularly, in the front-rear direction (distance), is more likely to arise. Further, if undulation, flaw, adhesion of foreign substances or the like occurs in the image-acquisition reference area during use of the sliding nozzle device, it also becomes a factor causing an error in the image processing.

If a measurement error arises in the distance between the sliding nozzle device and the robot arm, there arises a problem that, when the plate holding device mounted to the robot arm is moved to a position obtained by the image processing so as to allow the plate holding device to hold the plate, each of the engagement grooves 41 of the holding members and a corresponding one of the engagement protrusions 210 of the plate fail to engage with each other due to positional misalignment therebetween.

As above, it has been found that, since the sliding nozzle device is used under a very severe condition that it receives radiation heat of molten steel having a temperature of 1500° C. or more, while holding the plates through which the high-temperature molten steel passes, and is exposed to splash of the molten steel, and dust, the conventional position measurement technique has a problem of poor measurement accuracy in distance.

As shown in FIG. 21, the plate-receiving metal frame 6 disclosed in the Patent Document 1 comprises two guide protrusions 61 each for guiding a respective one of the two fixable portions 209 of the plate. Each of the guide protrusions 61 of the plate-receiving metal frame 6 has a base end-side portion formed in a columnar shape, and a distal end-side portion formed in a truncated cone shape.

When attaching the plate 2 to the plate-receiving metal frame 6, the plate 2 is inserted into the plate-receiving metal frame 6, such that respective openings 209a of the fixable portions 209 provided at the longitudinal opposite ends of the plate 2 are moved, respectively, along the guide protrusions 61 of the plate-receiving metal frame 6, so that the longitudinal and widthwise positions of the plate 2 will be guided to accurate positions, with respect to the plate-receiving metal frame 6. The plate 2 attached to the plate-receiving metal frame 6 is held by lock mechanisms 7 so as to prevent dropping from the plate-receiving metal frame 6.

In this connection, the present inventors attempted to, under the condition that the sliding nozzle device was used in an iron foundry, and the plate holding device 1 disclosed in the Patent Document 1 was mounted to an articulated robot arm, attach the plate to the plate-receiving metal frame of the sliding nozzle device using the plate holding device 1. As a result, it has been found that a gap arises between the plate and a bottom surface of the plate-receiving metal frame, and thereby holding of the plate by the lock mechanisms becomes insufficient, in some cases. Such a gap does not cause any problem as long as it is not excessively large, because the gap will disappear or become vanishingly small when the plate-receiving metal frame is closed to apply a surface pressure between the plates. However, depending on the size of the gap, there is a problem that the plate fails to be firmly fixed to the plate-receiving metal frame, resulting in dropping or displacement during use, or a problem that, in a case where the plate is an upper plate, a joint thickness on a bonding surface of the upper plate with the upper nozzle increases. The displacement of the plate during use or the increase in the thickness of the joint can lead to a risk of leakage of molten steel during use.

As a method to hold the plate in the plate-receiving metal frame, other than the method disclosed in the Patent Document 1, it is common to fix the plate to the plate-receiving metal frame by tightening bolts, as disclosed in the below-mentioned Patent Document 2. Even in a case where this fixing method is employed, the plate holding device disclosed in the Patent Document 1 can also be used to hold the plate so as to perform the plate attaching or detaching operation, in a state in which the bolts are loosened.

In the devices disclosed in the Patent Documents 1 and 2, there is a situation where it becomes difficult to detach the plate in an actual usage site, due to influences of dust generated during use, high-temperature deformation of the metal frame and the like, and solidified molten steel, etc. In this situation, there is a problem that, even when it is attempted to take out the plate using the plate holding device, a swingable metal frame is followingly moved in a taking-out direction of the plate, and thereby the plate becomes unable to be taken out.

Further, in the aforementioned plate replacement operation, when fittingly attaching a new plate to the plate-receiving metal frame, the plate is fittingly attached to a receiving portion of the plate-receiving metal frame while being pressed by a robot arm. However, the plate is not fitted into the receiving portion, and thereby a problem in fittingly attaching the plate arises, in some cases.

CITATION LIST

Patent Document

Patent Document 1: WO-A 2018/074424
Patent Document 2: JP-A 2011-104606

SUMMARY OF INVENTION

Technical Problem

A problem to be solved by the present invention is to provide a plate holding device, a plate detaching apparatus, a plate attaching apparatus and a plate attaching-detaching apparatus which are capable of reliably attaching and/or detaching a plate with respect to a plate-receiving metal frame.

Solution to Technical Problem

The present inventors have found that a plate can be reliably attached/detached with respect to a plate-receiving metal frame by: providing a pressing unit for pressing a central region of the plate when the plate is held by holding members of a plate holding device, and/or a force sensor for detecting a force received by the holding members from the held plate; and operating (widening/narrowing) the holding members of the plate holding device when the force detected by the force sensor reaches a given threshold.

As a result of various researches conducted to solve the above problem, the present inventors have also found that a plate can be reliably attached at a given position of the plate-receiving metal frame by modifying the operation of pressing the plate held by the plate holding device in a direction toward the plate-receiving metal frame, to a two-stage pressing operation consisting of a first-stage pressing operation to be performed in a state in which the plate is held by the holding members, and a second-stage pressing operation to be performed without holding the plate by the holding members.

Specifically, according to various aspects of the present invention, there are provided a plate holding device, a plate detaching apparatus, a plate attaching apparatus and a plate attaching-detaching apparatus, as described in the following sections 1 to 17.

1. A plate holding device comprising: a plurality of holding members for holding a plate for a sliding nozzle device; widening and narrowing means to selectively widen and narrow a distance between the holding members; a pressing unit for pressing a central region of the plate when the plate is held by the holding members; and a force sensor for detecting a force received by the holding members and/or the pressing unit from the held plate.

2. A plate detaching apparatus for detaching a plate from a plate-receiving metal frame of a sliding nozzle device, wherein the plate detaching apparatus comprises: a robot arm; the plate holding device as described in the section 1, wherein the plate holding device is mounted to a distal end of the robot arm; and a control unit for controlling operations of the robot arm and the plate holding device, wherein the control unit is operable to: controllably operate the robot arm so as to move the plate holding device toward a plate attached to the plate-receiving metal frame; then when the force detected by the force sensor reaches a given threshold, controllably operate the robot arm so as to stop the movement of the plate holding device, and controllably operate the widening and narrowing means so as to narrow the distance between the holding members to hold the plate; and then controllably operate the robot arm so as to detach the held plate from the plate-receiving metal frame.

3. A plate attaching apparatus for attaching a plate to a plate-receiving metal frame of a sliding nozzle device, wherein the plate attaching apparatus comprises: a robot arm; the plate holding device as described in the section 1, wherein the plate holding device is mounted to a distal end of the robot arm; and a control unit for controlling operations of the robot arm and the plate holding device, wherein the control unit is operable to: controllably operate the robot arm so as to move a plate held by the plate holding device toward the plate-receiving metal frame; and, then when the force detected by the force sensor reaches a given threshold, controllably operate the robot arm so as to stop the movement of the plate holding device, and controllably operate the widening and narrowing means so as to widen the distance between the holding members to release the plate, thereby attaching the plate to the plate-receiving metal frame.

4. A plate attaching apparatus for attaching a plate to a plate-receiving metal frame of a sliding nozzle device, wherein the plate attaching apparatus comprises: a robot arm; the plate holding device as described in the section 1, wherein the plate holding device is mounted to a distal end of the robot arm; and a control unit for controlling operations of the robot arm and the plate holding device, wherein the control unit is operable to: controllably operate the robot arm so as to move a plate held by the plate holding device toward the plate-receiving metal frame; then when the force detected by the force sensor reaches a given threshold, controllably operate the robot arm so as to stop the movement of the plate holding device, and controllably operate the widening and narrowing means so as to widen the distance between the holding members to release the plate; and, in a state in which the plate is released, controllably operate the robot arm so as to further move the plate holding device toward the plate-receiving metal frame, and, then when the force detected by the force sensor reaches a given threshold, stop the movement of the plate holding device; and then controllably operate the robot arm so as to move only the plate holding device away from the plate-receiving metal frame, thereby attaching the plate to the plate-receiving metal frame.

5. The plate holding device as described in the section 1, which comprises a pressing mechanism for inhibiting a swingable metal frame openable and closable with respect to a fixed metal frame of the sliding nozzle device from being swung in a closing direction.

6. The plate holding device as described in the section 5, wherein each of the holding members is disposed such that a distal end thereof protrudes with respect to a contact part of the pressing mechanism, wherein, in a state in which the holding members are inserted in the swingable metal frame, the contact part of the pressing mechanism is disposed to form a gap with respect to the swingable metal frame.

7. The plate holding device as described in the section 5 or 6, wherein the pressing mechanism is movable forwardly and backwardly or extendable and retractable, with respect to the swingable metal frame.

8. The plate holding device as described in the section 5, wherein the pressing mechanism is capable of pressing the swingable metal frame in an open direction.

9. The plate holding device as described in the section 5, wherein the pressing mechanism is configured to, when the holding members hold the plate received in the swingable metal frame, press the swingable metal frame to disengage at least a portion of the plate from the swingable metal frame.

10. The plate holding device as described in the section 5, wherein the pressing mechanism is configured such that, at least during a transition period from a state in which the holding members hold the plate to a state in which an engagement between the plate and the swingable metal frame is released, a contact part of the pressing mechanism continues to contact the swingable metal frame.

11. A plate attaching-detaching apparatus comprising a robot arm, and the plate holding device as described in any one of the sections 5 to 10, wherein the plate holding device is mounted to a distal end of the robot arm.

12. The plate holding device as described in the section 1, which comprises a vibration unit for applying vibration to the held plate.

13. The plate holding device as described in the section 12, wherein the pressing unit is capable of pressing the held plate toward a plate-receiving metal frame of the sliding nozzle plate, and wherein the vibration unit is configured to contact the pressing unit to apply vibration to the held plate through the pressing unit.

14. The plate holding device as described in the section 13, wherein the vibration unit is configured to be activated to vibrate, when the pressing unit presses the held plate.

15. The plate holding device as described in the section 13, wherein, in a state in which the holding members hold a plate for the sliding nozzle device, the pressing unit is disposed between the held plate and the vibration unit.

16. The plate holding device as described in the section 13, which is configured such that, in an operation of fittingly attaching a plate for the sliding nozzle device to the plate-receiving metal frame, the pressing unit starts to press the plate after the holding members release the holding of the plate, and the vibration unit starts to vibrate when the pressing unit starts the pressing of the plate.

17. A plate attaching-detaching apparatus comprising a robot arm, and the plate holding device as described in any one of the sections 12 to 16, wherein the plate holding device is mounted to a distal end of the robot arm.

According to another aspect of the present invention, there is provided a plate holding device configured to be mounted to a distal end of a robot arm so as to selectively attach and detach a plate with respect to a plate-receiving metal frame of a sliding nozzle device, wherein the plate-receiving metal frame is composed of a fixed metal frame, or a swingable metal frame openable and closable with respect to the fixed metal frame, wherein the plate holding device comprises: a holding member for holding the plate; and a pressing mechanism for inhibiting the swingable metal frame from being swung in a closing direction.

According to yet another aspect of the present invention, there is provided a plate holding device configured to be mounted to a distal end of a robot arm so as to selectively attach and detach a plate with respect to a plate-receiving metal frame of a sliding nozzle device, wherein plate holding device comprises: a holding member for holding the plate; and a vibration unit for applying vibration to the held plate.

Effect of Invention

The present invention makes it possible to reliably attach and/or detach a plate with respect to the plate-receiving metal frame.

BRIEF DESCRIPTION OF DRAWINGS

FIG. 7d is a partially enlarged diagram of the explanatory diagram in FIG. 7a.

DESCRIPTION OF EMBODIMENTS

First Embodiment

Figure 1:
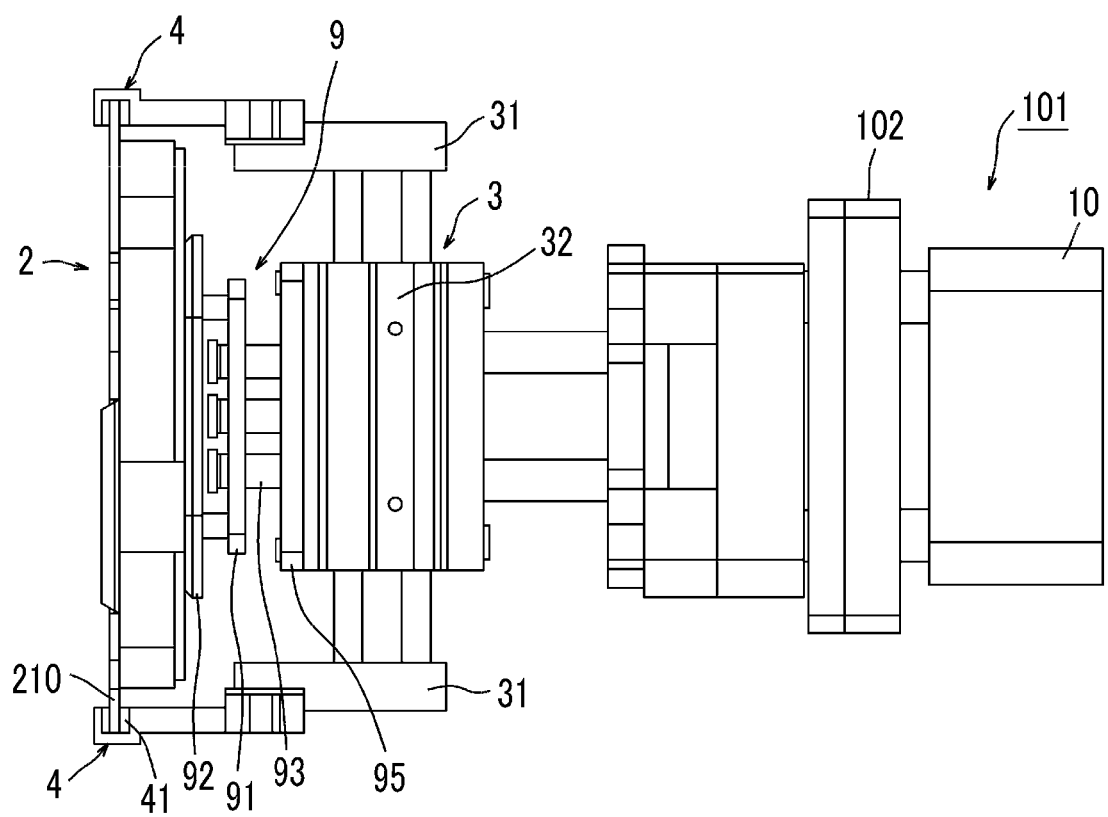
FIG. 1 is a side view of a plate holding device according to a first embodiment of the present invention, in a state in which it holds a plate (wherein only holding members are shown in cross-section).

A plate holding device 101 according to a first embodiment of the present invention is shown in FIG. 1. FIG. 1 is a side view of the plate holding device 101 in a state in which it holds a plate 2 (wherein only the after-mentioned holding members 4 are shown in cross-section).

Figure 17:
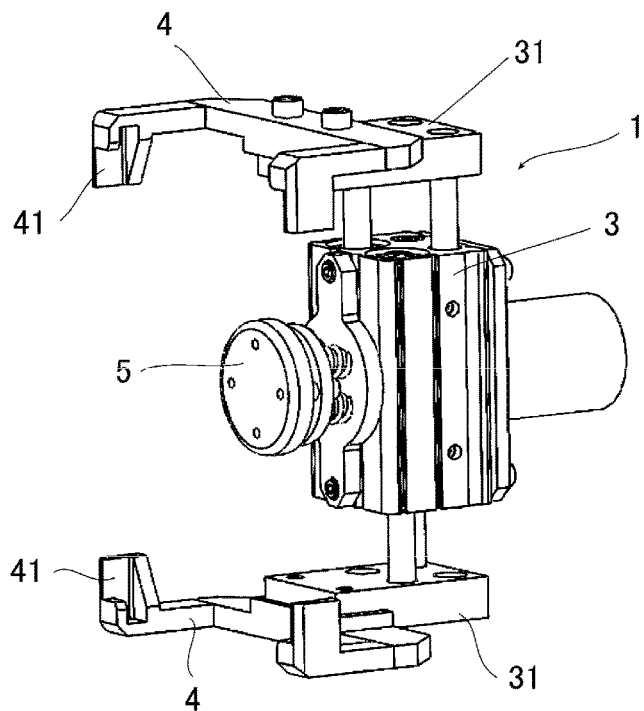
FIG. 17 is a perspective view of a plate holding device disclosed in the Patent Document 1.
Figure 18:
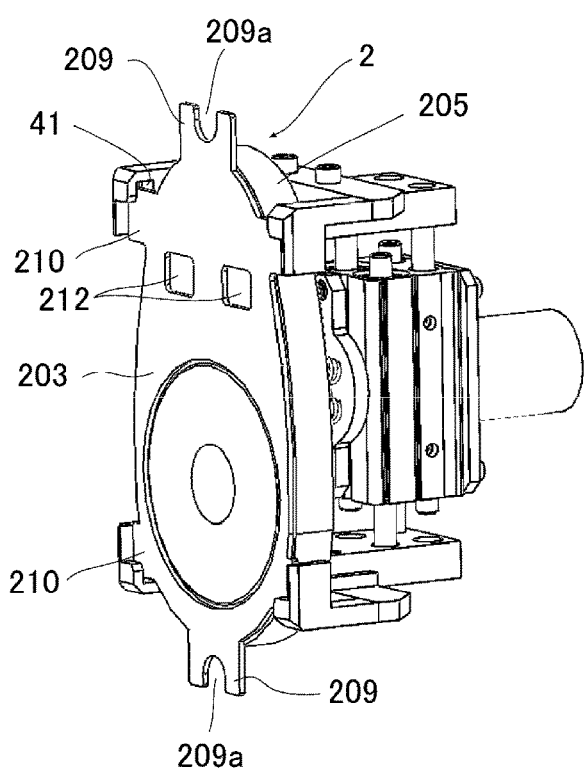
FIG. 18 is a perspective view of the plate holding device in FIG. 17 in a state in which it holds a plate.
Figure 19:
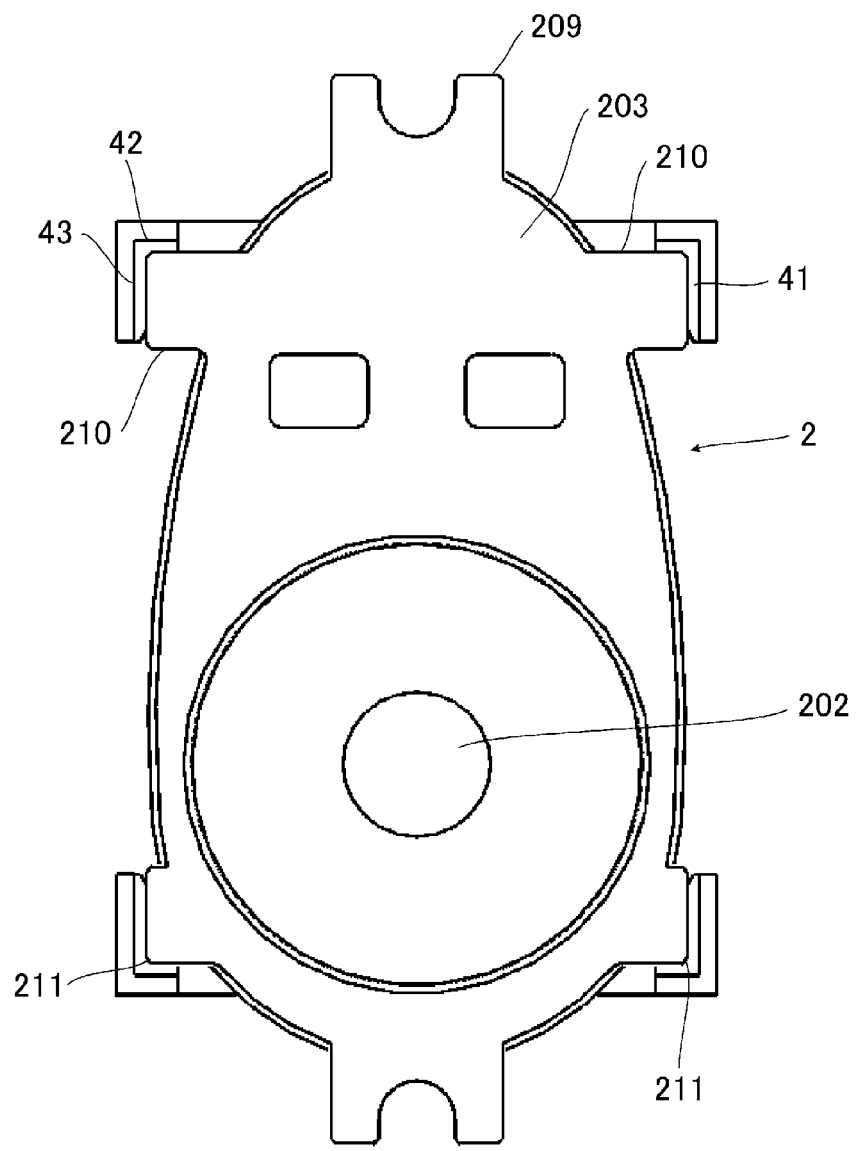
FIG. 19 is an explanatory diagram of a gap between a holding member of the plate holding device in FIG. 17 and a to-be-held portion of the plate.
Figure 20:
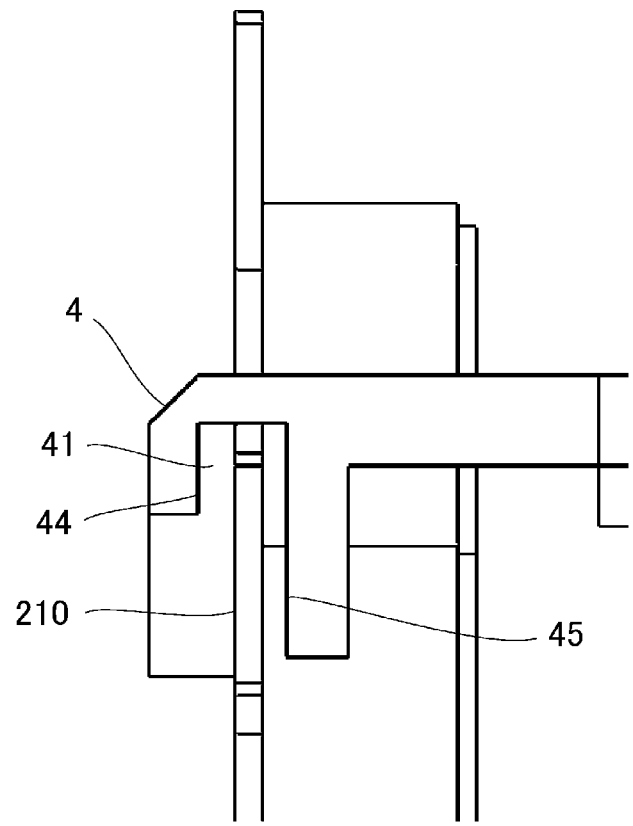
FIG. 20 is a partially enlarged sectional view of the holding member of the plate holding device in FIG. 17.
Figure 21:
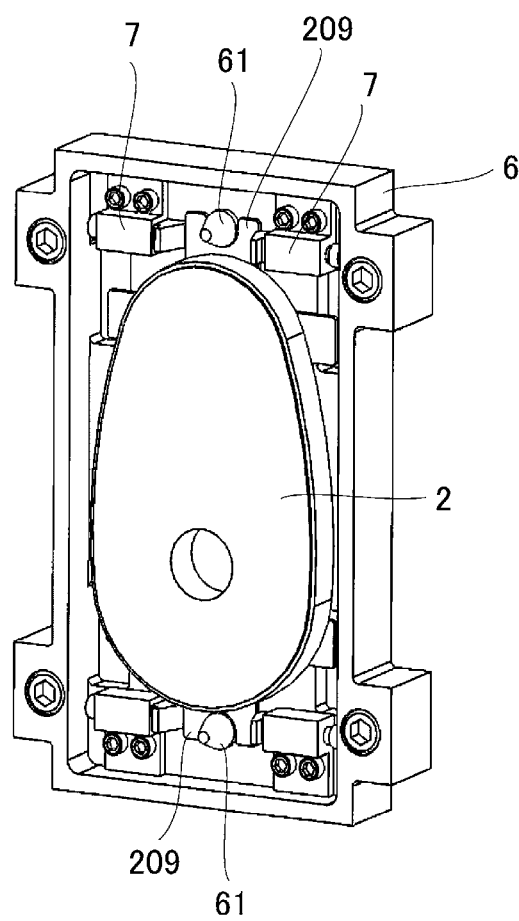
FIG. 21 is a perspective view of a plate-receiving metal frame and a plate attached to the plate-receiving metal frame.

The plate holding device 101 illustrated in FIG. 1 is obtained by modifying the plate holding device 1 disclosed in the Patent Document 1 as shown in FIGS. 17 and 18, such that the pressing unit 5 is changed to a pressing unit 9 having no coil springs, and a force sensor 10 is provided on the side opposite to the pressing unit 9 with respect to a parallel gripper (parallel hand) 3 serving as widening and narrowing means.

As shown in FIG. 1, the pressing unit 9 comprises a support plate 91 which is attached to a gripper body 32 of the parallel gripper 3 by bolts 93. A pressing plate 92 is fixed to the support plate 91, so that the support plate 91 and the pressing plate 92 are integrated together. This pressing plate 92 is set at a position which allows four engagement grooves 41 in a pair of (two) holding members 4 each attached to a respective one of two parallel claws 31 of the parallel gripper 3 and four engagement protrusions 210 of the plate 2 to be engaged with each other, when the pressing plate 92 presses a central region of the plate 2. That is, the pressing unit 9 (pressing plate 92) is disposed at a position which allows the pressing unit 9 to press the central region of the plate 2 when the plate 2 is held by the pair of holding members 4. In other words, in a state in which the plate 2 is placed at a position where it contacts the pressing unit 9 (pressing plate 92), the pair of holding members 4 can be moved to narrow a distance therebetween so as to hold the plate 2.

It should be noted here that the widening and narrowing means is not limited to the parallel gripper 3. For example, a parallel chuck may be used. Alternatively, it may be composed using a hydraulic cylinder, an air cylinder or the like. Further, the widening and narrowing means is not necessarily limited to the configuration in which the pair of holding members 4 are selectively widened and narrowed while maintaining a parallel relationship therebetween. For example, it may be configured such that a distance between the distal ends of the pair of holding members 4 are selectively widened and narrowed by swinging movements of the pair of holding members 4 about respective base ends (intersection point) thereof.

The force sensor 10 is attached, by bolts, to a flange 102 on the side opposite to the pressing unit 9 with respect to the gripper body 32 of the parallel gripper 3. That is, the force sensor 10 is a sensor configured to detect a force received by the holding members 4 and/or the pressing unit 9 from the held plate 2. Such a force sensor to detect a force is also referred to as "haptic sensor", and a type of haptic sensor commonly used in robot arms or the like may be employed. In this embodiment, a six-axis force sensor is used as the force sensor 10.

Figure 2:
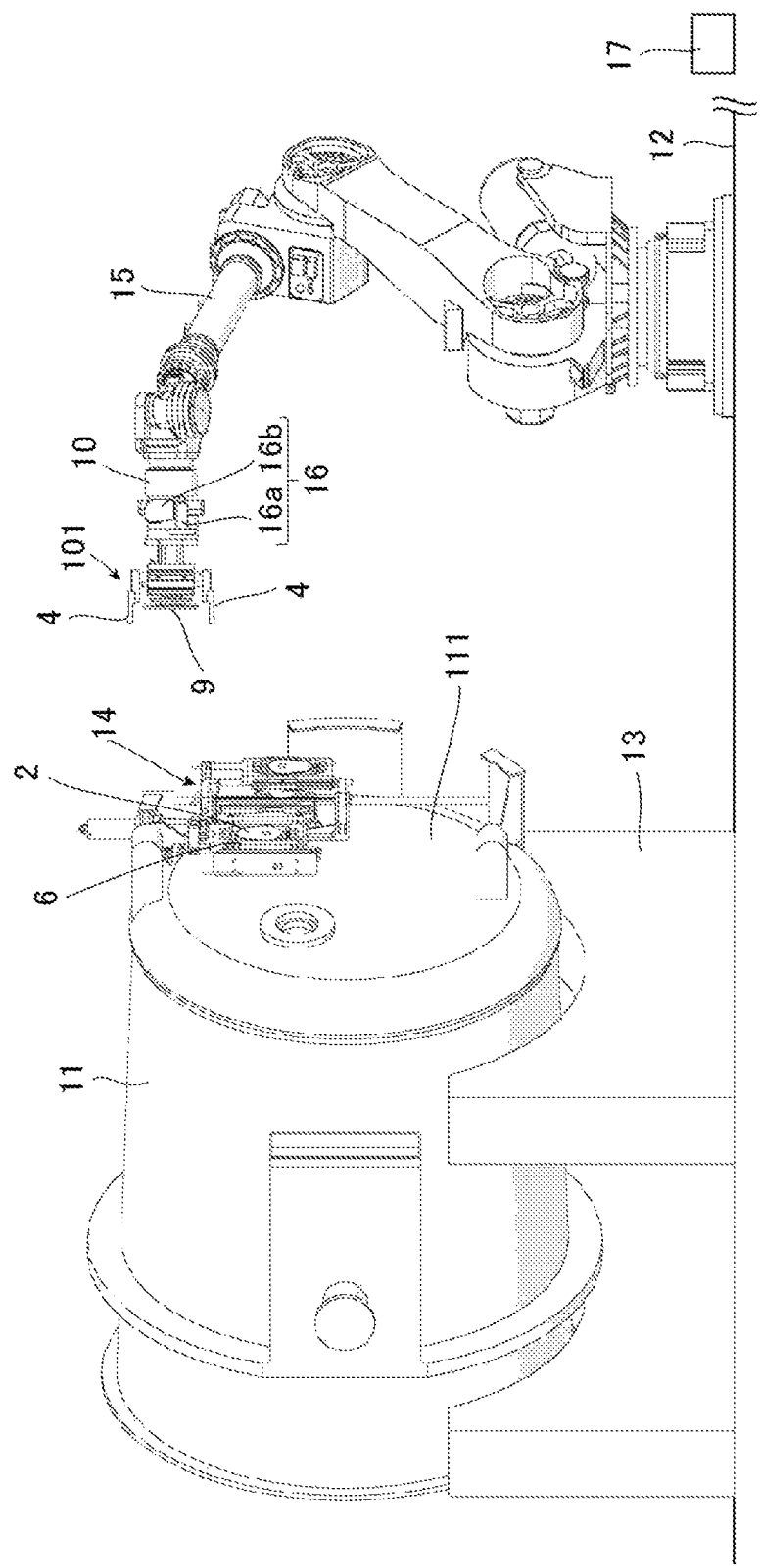
FIG. 2 is an explanatory diagram showing a usage state of a plate detaching apparatus equipped with the plate holding device illustrated in FIG. 1.

A plate detaching apparatus equipped with the plate holding device 101 is shown in FIG. 2.

In FIG. 2, a ladle 11 just after completion of casting is laid down on a ladle support 13 installed on a floor 12. A sliding nozzle device 14 is attached to the bottom 111 of the ladle 11. On the other hand, a robot arm 15 is installed such that a base end thereof is fixed to a robot arm mount (illustration is omitted) provided on the floor 12, and a flange of the force sensor 10 of the plate holding device 101 is mounted to a distal end of the robot arm 15 by bolts. Here, the force sensor 10 and the distal end of the robot arm 15 are arranged in series, such that central axes thereof are aligned with each other. In this embodiment, the robot arm 15 is a 6-axis vertical articulated robot arm, and capable of freely changing the posture and position of the plate holding device 101 mounted to the distal end thereof.

A three-dimensional sensor 16 comprising a camera 16a and a laser irradiator 16b is attached around the distal end of the robot arm 15. An image acquired by the camera 16a is input to an image processing device, and, in the image processing device, three-dimensional positional coordinates are corrected by an image processing process. The resulting coordinate information is input to a control unit 17, so that it becomes possible to controllably operate the robot arm 15 so as to move the plate holding device 101 to a position where the plate holding device 101 can hold the plate 2. On the other hand, information detected by the force sensor 10 is continuously input in the control unit 17. Then, the control unit 17 controls movement of the plate holding device 101, based on the information from the force sensor 10, etc.

Next, a method of taking out a plate from a plate-receiving metal frame will be described.

First of all, after opening the sliding nozzle device 14, an image of a plate-receiving metal frame 6 of the sliding nozzle device 14 is acquired by the camera 16a, while laser light is emitted from the laser irradiator 16b toward two image-acquisition reference areas (markers) provided, respectively, at an upper end and a lower end of the plate-receiving metal frame 6, and the resulting image is subjected to image processing, thereby computing a misalignment of the plate-receiving metal frame 6 with respect to a reference position and correcting three-dimensional positional coordinates of the plate-receiving metal frame 6. This corrected position of the plate-receiving metal frame 6 is input to the control unit 17, so that the robot arm 15 is operated to move the plate holding device 101 mounted to the robot arm 15 to the corrected position. At this point, the holding members 4 of the plate holding device is spaced apart from the plate 2 and the plate-receiving metal frame 6 to avoid contact therewith. Further, in this embodiment, the above corrected position is set to a position just before a position where the plate 2 received in the plate-receiving metal frame 6 is to be held by the holding members 4 of the plate holding device, e.g., by about 1 cm.

In this embodiment, the control unit 17 is operable to controllably operate the robot arm 15 so as to move the plate holding device 101 to the above corrected position, and, after stopping the plate holding device 101 at the corrected position once, further moving the plate holding device 101 toward the plate 2 received in the plate-receiving metal plate 6. During the latter movement, the pressing unit 9 of the plate holding device is brought into contact with the plate 2. Thus, the holding members 4 and/or the pressing unit 9 receive a force as a reaction force from the plate 2, and this force is detected by the force sensor 10. Then, the control unit 17 is operable to, when the force detected by the force sensor 10 reaches a given threshold (e.g., 300 N), controllably operate the robot arm 15 so as to stop the movement of the plate holding device 101, and controllably operate the parallel gripper 3 so as to narrow a distance between the pair of holding members 4, thereby holding the plate 2. After holding the plate 2, the control unit 17 is operable to controllably operate the robot arm 15 so as to move the plate holding device 101 backwardly, thereby detaching the plate 2 from the plate-receiving metal frame 6. In this embodiment, the plate detaching apparatus is configured to stop the plate holding device 101 at the aforementioned corrected position once. However, the stop at the corrected position may be omitted.

As above, in the first embodiment, when the force detected by the force sensor 10 reaches the given threshold, the movement of the plate holding device 101 is stopped, and, at the stop position, the distance between the pair of holding members 4 is narrowed to hold the plate 2. This makes it possible to reliably hold and detach the plate 2 received in the plate-receiving metal frame 6. That is, in the first embodiment, the plate detaching apparatus is configured such that, when the force detected by the force sensor 10 reaches the given threshold, the holding members 4 align with respective to-be-held portions (engagement protrusions 210) of the plate.

The plate detaching apparatus in the first embodiment can be used as a plate attaching apparatus. When used as a plate attaching apparatus, the control unit 17 may be configured to: controllably operate the robot arm 15 so as to move a plate 2 held by the plate holding device 101 toward the plate-receiving metal frame 6; and, then when the force detected by the force sensor 10 reaches a given threshold (e.g., 500 N), controllably operate the robot arm 15 so as to stop the movement of the plate holding device 101, and controllably operate the parallel gripper 3 so as to widen the distance between the holding members 4 to release the plate 2, thereby attaching the plate 2 to the plate-receiving metal frame 6.

Second Embodiment

Figure 3:
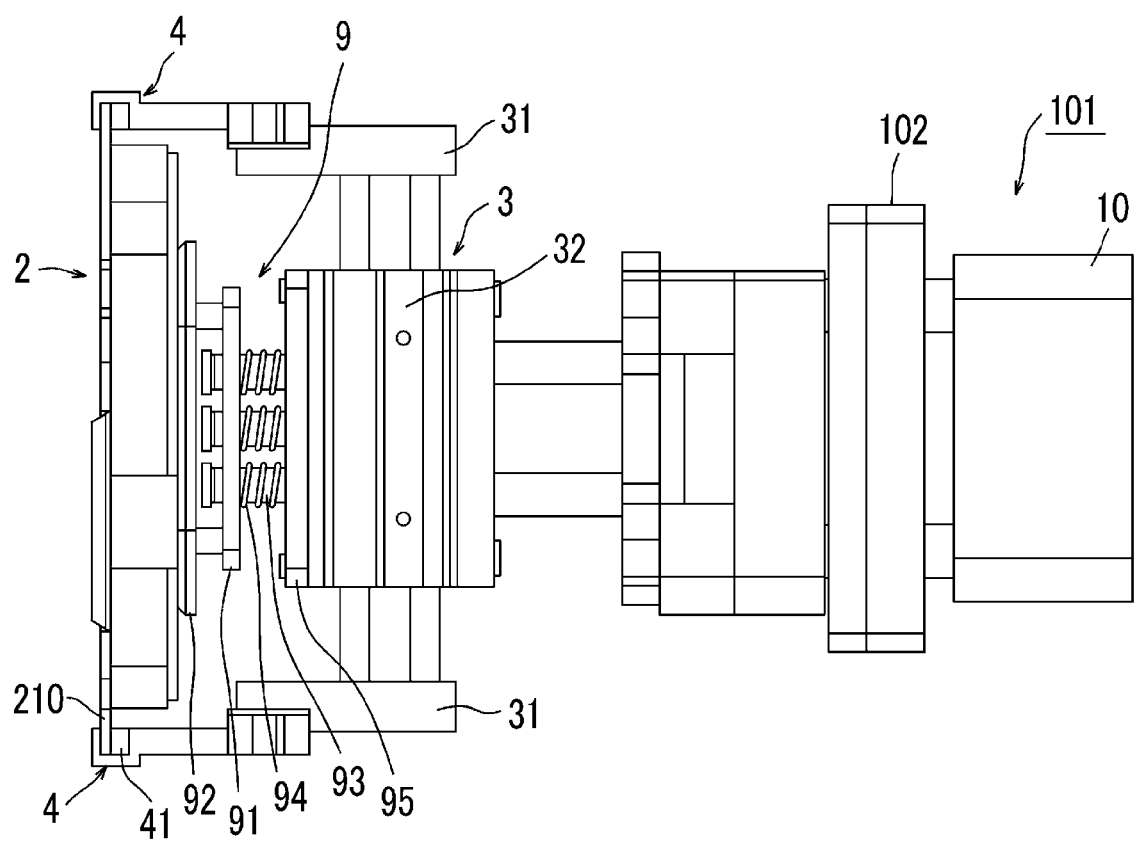
FIG. 3 is a side view of a plate holding device according to a second embodiment of the present invention, in a state in which it holds a plate (wherein only holding members are shown in cross-section).

A plate holding device 101 according to a second embodiment of the present invention is shown in FIG. 3. FIG. 3 is a side view of the plate holding device 101 in a state in which it holds a plate 2 (wherein only the after-mentioned holding members 4 are shown in cross-section).

The plate holding device 101 illustrated in FIG. 3 is obtained by modifying the pressing unit 9 of the plate holding device 101 according to the first embodiment illustrated in FIG. 1, to a pressing unit 9 having coil springs as with the Patent Document 1. However, it should be noted that, in the Patent Document 1, four coil springs are used, whereas, in the second embodiment, seven coil springs 94 are used in the pressing unit 9.

More specifically, in the second embodiment, seven bolts 93 are fixed to a base plate 95 while penetrating through seven through-holes of a support plate 91 and the seven coil springs 94, as shown in FIG. 3. This base plate 95 is attached to a gripper body 32 of a parallel gripper (parallel hand) 3. A pressing plate 92 is fixed to the support plate 91, so that the support plate 91 and the pressing plate 92 are integrated together. Thus, the pressing plate 92 can be moved toward the base plate 95 while compressing the coil springs 94. Here, a certain gap may be provided between each of the through-holes of the support plate 91 and a corresponding one of the bolts 93. In this case, the pressing plate 92 can be moved even when it is in a tilted state. The pressing plate 92 is set at a position where the coil springs 94 are compressed when the plate 2 is held by holding members 4 (engagement grooves 41) of the plate holding device 101. Therefore, the plate is pressed against a plate-receiving metal frame-side region of an inner wall surface of each of the engagement grooves 41.

The plate holding device 101 having the pressing unit 9 with the coil springs also comprises a force sensor 10 like that in the plate holding device 101 according to the first embodiment, so that it is possible to obtain the same functions/effects as those of the plate holding device 101 according to the first embodiment. Further, the plate holding device 101 according to the second embodiment may be mounted to the distal end of the robot arm 15 as shown in FIG. 2, to provide a plate detaching apparatus or a plate attaching apparatus.

Third Embodiment

Figure 4:
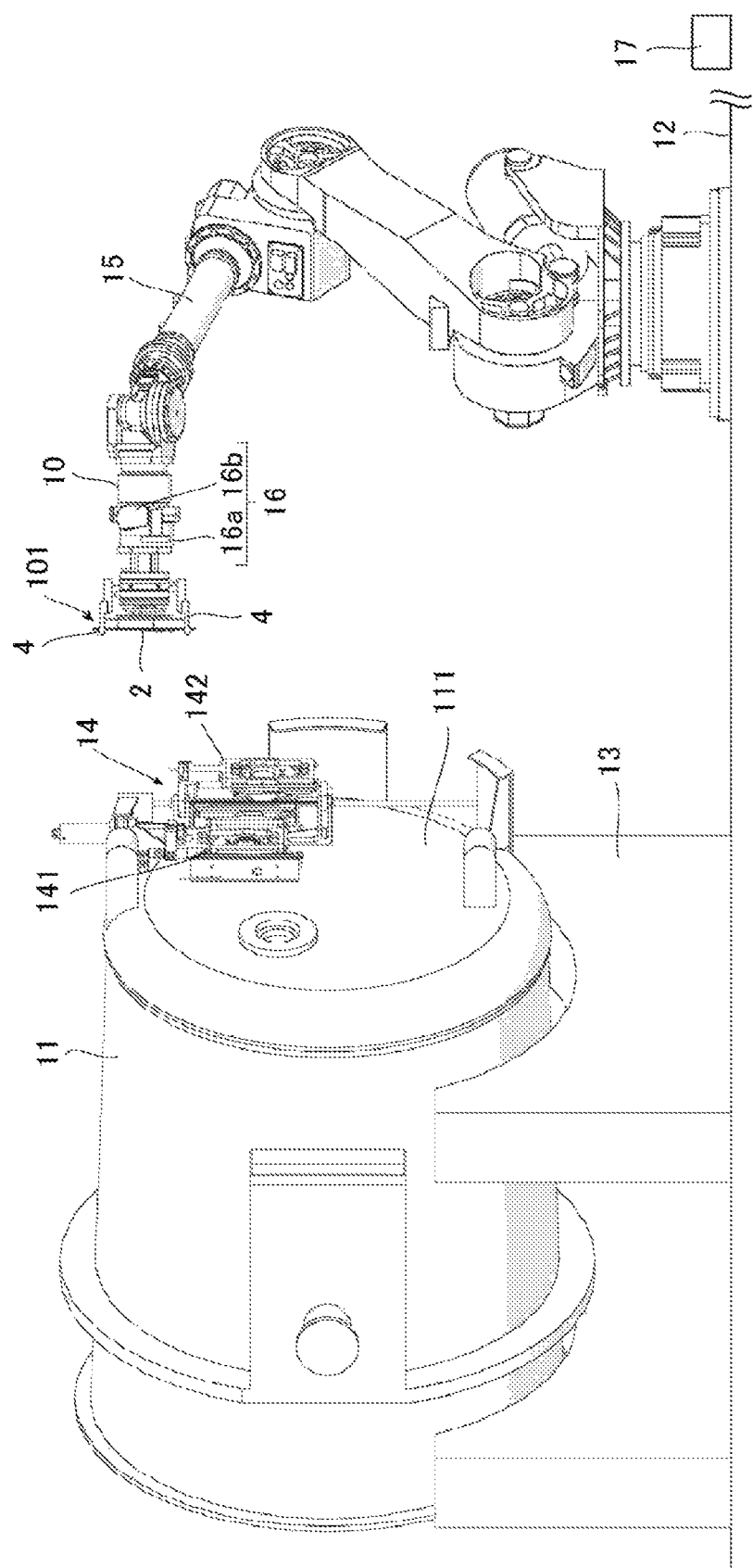
FIG. 4 is an explanatory diagram showing a usage state of a plate attaching apparatus according to a third embodiment of the present invention.
Figure 5:
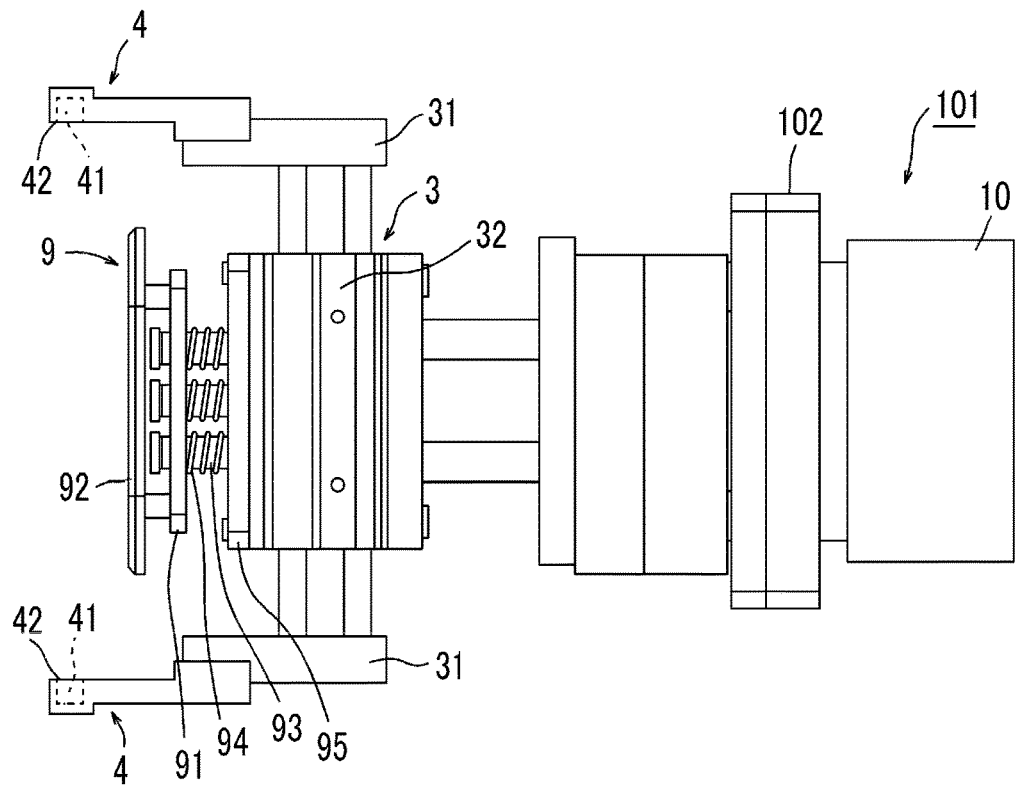
FIG. 5 is a side view of a plate holding device used in the plate attaching apparatus illustrated in FIG. 4.

A usage state of a plate attaching apparatus according to a third embodiment of the present invention is shown in FIG. 4. Further, a plate holding device used in the plate attaching apparatus illustrated in FIG. 4 is shown in FIG. 5.

First of all, with reference to FIG. 5, the plate holding device 101 used in the third embodiment will be described.

This plate holding device 101 is obtained by modifying the plate holding device 1 disclosed in the Patent Document 1 as shown in FIG. 17, such that the pressing unit 5 is changed to a pressing unit 9, and a force sensor 10 is provided on the side opposite to the pressing unit 9 with respect to a parallel gripper (parallel hand) 3 serving as widening and narrowing means.

More specifically, the plate holding device 101 comprises: a parallel gripper (parallel hand) 3 serving as widening and narrowing means; a pair of (two) holding members 4 each attached to a respective one of parallel claws 31 of the parallel gripper 3; and a pressing unit 9 provided in front of a gripper body 32 of the parallel gripper 3, and a force sensor 10 provided on the side opposite to the pressing portion 9 with respect to the parallel gripper 3. Further, each of the holding members 4 has two lateral arm portions, wherein an engagement groove 41 is formed at a distal end of each of the lateral arm portions. Here, the plate holding device 101 is configured such that, when holding a plate, a gap of 5 mm is ensured between each of the after-mentioned engagement protrusions 210 and an inner wall surface of a corresponding one of the engagement grooves 41. As a result of providing the gap in the above manner, the plate can move in any direction (in any of longitudinal, width and thickness directions of the plate) within the range of the gap.

It should be noted here that the widening and narrowing means is not limited to the parallel gripper 3. For example, a parallel chuck may be used. Alternatively, it may be composed using a hydraulic cylinder, an air cylinder or the like. Further, the widening and narrowing means is not necessarily limited to the configuration in which the pair of holding members 4 are selectively widened and narrowed while maintaining a parallel relationship therebetween. For example, it may be configured such that a distance between the distal ends of the pair of holding members 4 are selectively widened and narrowed by swinging movements of the pair of holding members 4 about respective base ends (intersection point) thereof.

The pressing unit 9 has a similar structure to that of the pressing unit 5 of the plate holding device 1 disclosed in the Patent Document 1 as shown in FIG. 17. However, it should be noted that, in the Patent Document 1, four coil springs are used, whereas, in the third embodiment, seven coil springs are used in the pressing unit 9.

More specifically, in the third embodiment, seven bolts 93 are fixed to a base plate 95 while penetrating through seven through-holes of a support plate 91 and the seven coil springs 94, as shown in FIG. 5. This base plate 95 is attached to the gripper body 32 of the parallel gripper 3. A pressing plate 92 is fixed to the support plate 91, so that the support plate 91 and the pressing plate 92 are integrated together. Thus, the pressing plate 92 can be moved toward the base plate 95 while compressing the coil springs 94. Here, a certain gap may be provided between each of the through-holes of the support plate 91 and a corresponding one of the bolts 93. In this case, the pressing plate 92 can be moved even when it is in a tilted state. The pressing plate 92 is set at a position where the coil springs 94 are compressed when the plate is held by the holding members 4 (engagement grooves 41). Therefore, the plate is pressed against a plate-receiving metal frame-side region of an inner wall surface of each of the engagement grooves 41.

The force sensor 10 is attached, by bolts, to a flange 102 on the side opposite to the pressing unit 9 with respect to the gripper body 32 of the parallel gripper 3. That is, the force sensor 10 is a sensor configured to detect a force received by the holding members 4 and/or the pressing unit 9 from the held plate 2. Such a force sensor to detect a force is also referred to as "haptic sensor", and a type of haptic sensor commonly used in robot arms or the like may be employed. In the third embodiment, a six-axis force sensor is used as the force sensor 10.

Figure 6:
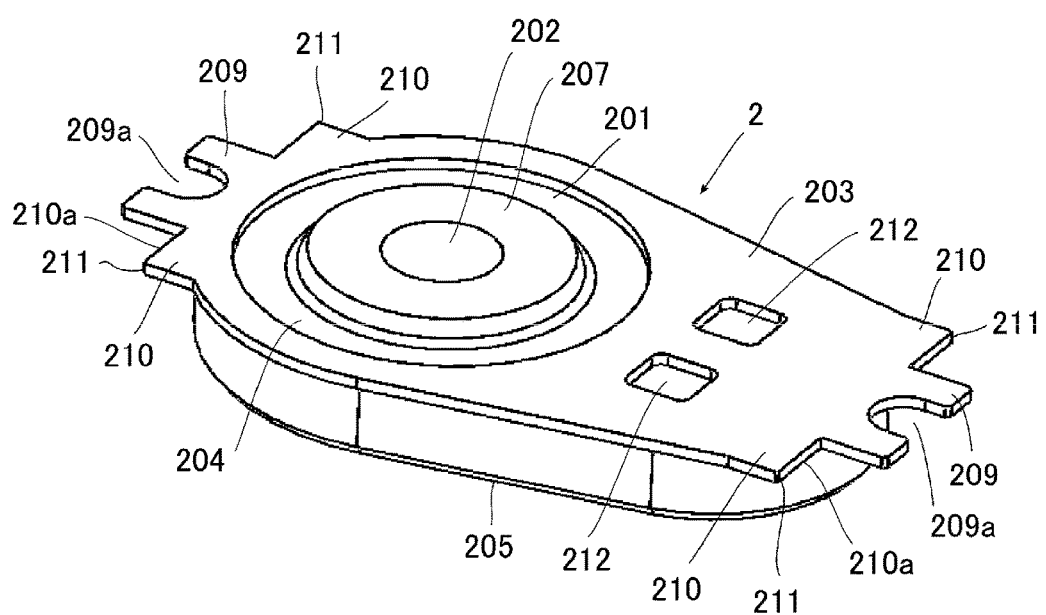
FIG. 6 is a perspective view of a plate (upper plate) used in the third embodiment.

In the third embodiment, the plate 2 having the same configuration as that in the Patent Document 1 is used. Specifically, as shown in FIG. 6, the plate 2 comprises: a refractory plate body 201; a metal back plate 203 on the back side of the plate body; a metal band 205 covering a side (peripheral) surface of the plate body; and two plate-shaped fixable portions 209 each extending outwardly from a respective one of longitudinal opposite ends of the back plate 203. The back plate 203 also has an engagement protrusion 210 by a number of two at each of longitudinal opposite ends thereof, i.e., by a number of four in total. Further, the back plate 203 has two fitting recesses 212 configured to fittingly receive two fitting protrusions (not illustrated) provided on a plate-receiving metal frame, respectively, thereby preventing displacement of the plate even when a force is applied to the plate in a sliding direction of the plate.

Next, with reference to FIG. 4, the usage state and the overall configuration of the plate attaching apparatus according to the third embodiment will be described.

In FIG. 4, a ladle 11 just after completion of casting is laid down on a ladle support 13 installed on a floor 12. A sliding nozzle device 14 is attached to the bottom 111 of this ladle, and, in the posture illustrated in FIG. 4, the sliding direction is approximately aligned with a vertical direction. This sliding nozzle device 14 is placed in a state in which a sliding metal frame 142, i.e., a plate-receiving metal frame for a lower plate, is opened with respect to a fixed metal frame 141, i.e., a plate-receiving metal frame for an upper plate, wherein the upper plate and the lower plate are detached, respectively, from the fixed metal frame 141 and the sliding metal frame 142.

On the other hand, a robot arm 15 is installed such that a base end thereof is fixed to a robot arm mount (illustration is omitted) provided on the floor 12, and a flange of the force sensor 10 of the plate holding device 101 is mounted to a distal end of the robot arm 15 by bolts. Here, the force sensor 10 and the distal end of the robot arm 15 are arranged in series, such that central axes thereof are aligned with each other.

In this embodiment, the robot arm 15 is a 6-axis vertical articulated robot arm, and capable of freely changing the posture and position of the plate holding device 101 mounted to the distal end thereof.

A three-dimensional sensor 16 comprising a camera 16a and a laser irradiator 16b is attached around the distal end of the robot arm 15. An image acquired by the camera 16a is input to an image processing device, and, in the image processing device, three-dimensional positional coordinates are corrected by an image processing process. The resulting coordinate information is input to a control unit 17, so that it becomes possible to controllably operate the robot arm 15 so as to move the plate holding device 101 to a plate attaching position. On the other hand, information detected by the force sensor 10 is continuously input in the control unit 17. Then, the control unit 17 controls movement of the plate holding device 101, based on the information from the force sensor 10, etc.

Next, with reference to FIG. 4 and FIGS. 7a to 7d, a method of attaching the plate 2 to the fixed metal frame 141 of the sliding nozzle device 14 attached to the bottom 111 of the ladle 11 will be described. Here, FIGS. 7a to 7d show an example where the plate 2 held by the plate holding device 101 is moved closer to a bottom surface 143 of the fixed metal frame 141, in a tilted posture, instead of a vertical posture. Although the plate attaching apparatus according to the third embodiment is capable of attaching a plate to each of the fixed metal frame 141 which is the plate-receiving metal frame for the upper plate and the sliding metal frame 142 as the plate-receiving metal frame for the lower plate, the following description will be made about only a method of attaching the upper plate to the fixed metal frame 141. Further, since the upper plate and the lower plate have the same configuration, the upper plate will also be referred to simply as "plate" in the following description.

First of all, in FIG. 4, an image of the fixed metal frame 141 of the sliding nozzle device 14 from which a used plate is detached is acquired by the camera 16a, while laser light is emitted from the laser irradiator 16b toward the fixed metal frame 141, and the resulting image is subjected to image processing, thereby computing a misalignment of the fixed metal frame 141 with respect to a reference position and correcting three-dimensional positional coordinates of the fixed metal frame 141. This corrected position of the fixed metal frame 141 is input to the control unit 17, so that the robot arm 15 is operated to move the plate holding device 101 mounted to the robot arm 15 to the corrected position (the state illustrated in FIG. 7a). In this embodiment, the above corrected position is set to a position just before a given position of the fixed metal frame 141 in which the plate is to be received, e.g., by about 1 cm.

In FIGS. 7a to 7d, the fixed metal frame 141 comprises two lock mechanisms 7 each for holding a respective one of the two fixable portions 209 at the upper and lower ends of the plate 2, and two guide protrusions 61 each finable in a respective one of respective openings 209a (see FIG. 6) of the fixable portions 209 to position the plate 2. Each of the guide protrusions 61 is structurally the same as that disclosed in the Patent Document 1. Further, each of the lock mechanisms 7 is different from that in the Patent Document 1, in terms of an installation position thereof on the bottom surface 143 of the fixed metal frame 141, but structurally the same as that in the Patent Document 1.

Figure 7A:
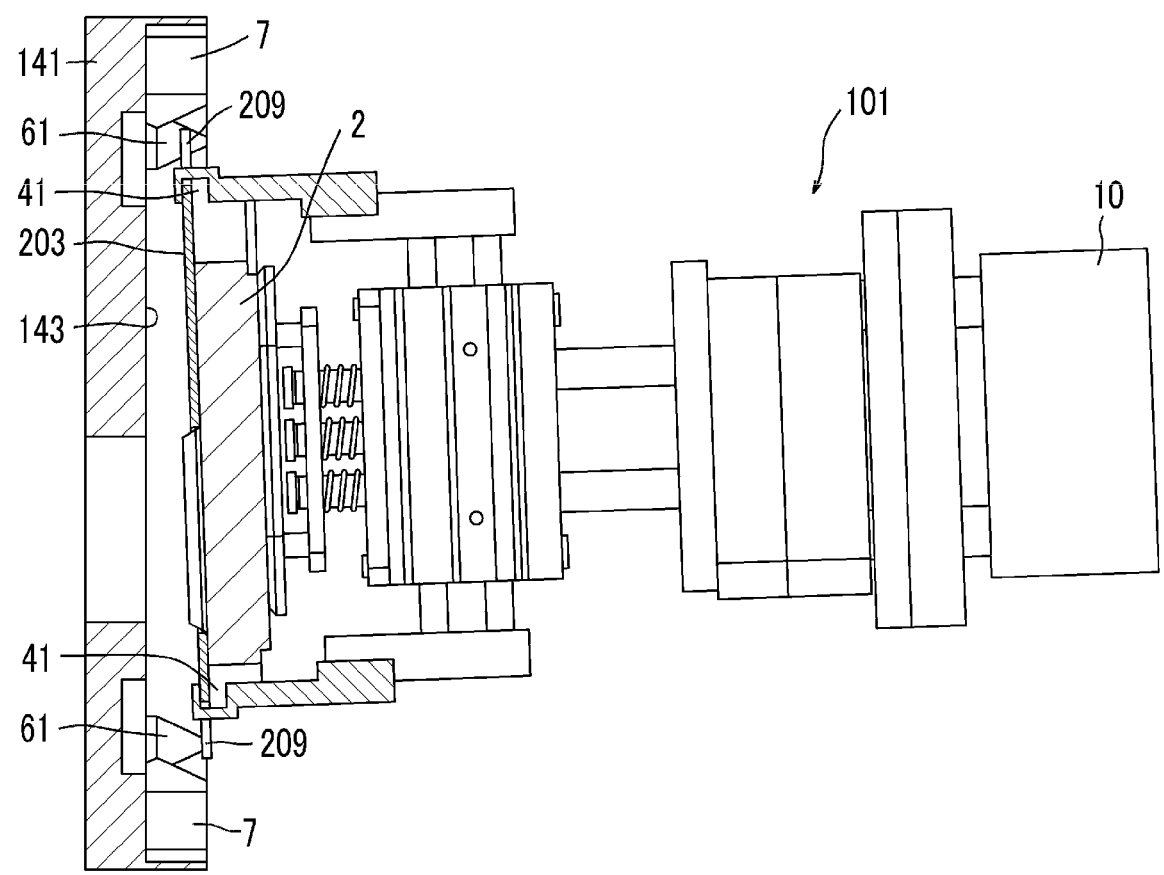
FIG. 7a is an explanatory diagram showing a positional relationship among the plate (upper plate), the plate holding device and a fixed metal frame (plate-receiving metal frame) in the third embodiment.
Figure 7B:
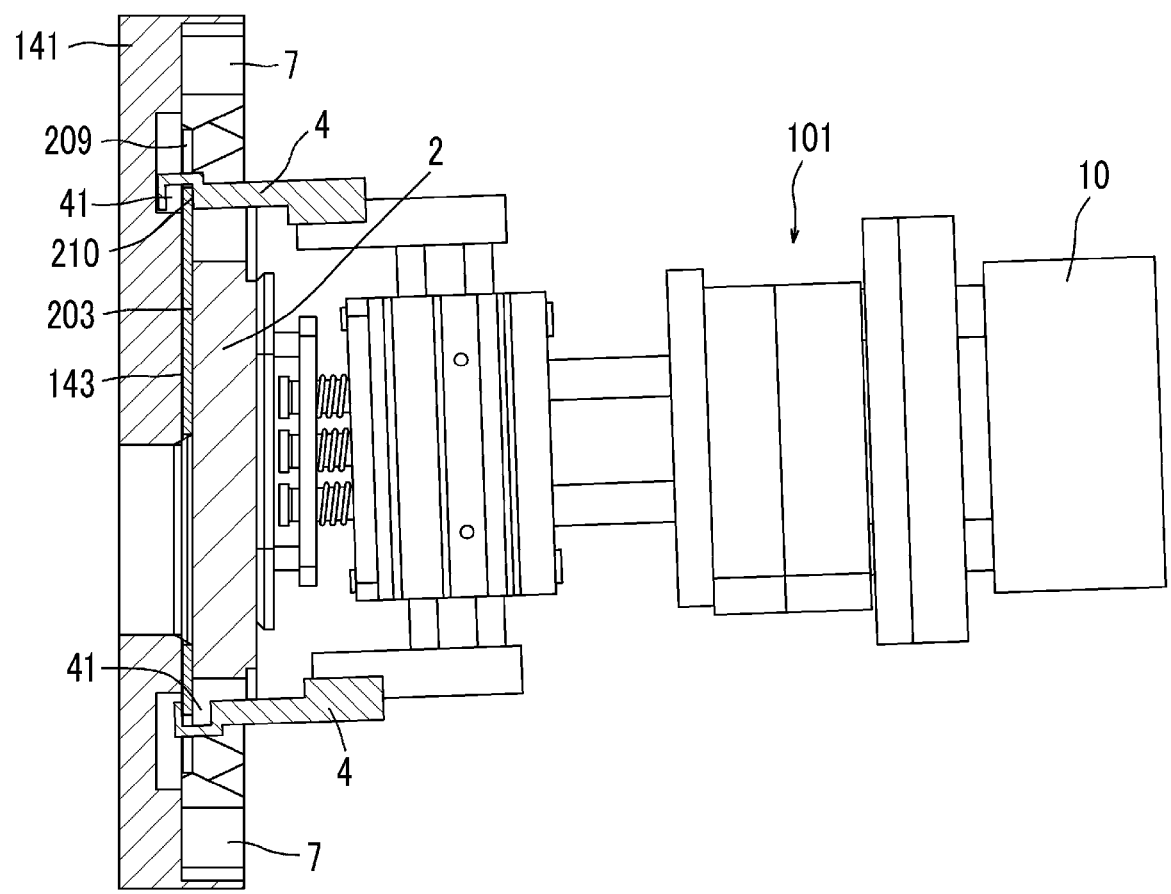
FIG. 7b is an explanatory diagram showing the positional relationship among the plate (upper plate), the plate holding device and the fixed metal frame (plate-receiving metal frame) in the third embodiment.
Figure 7C:
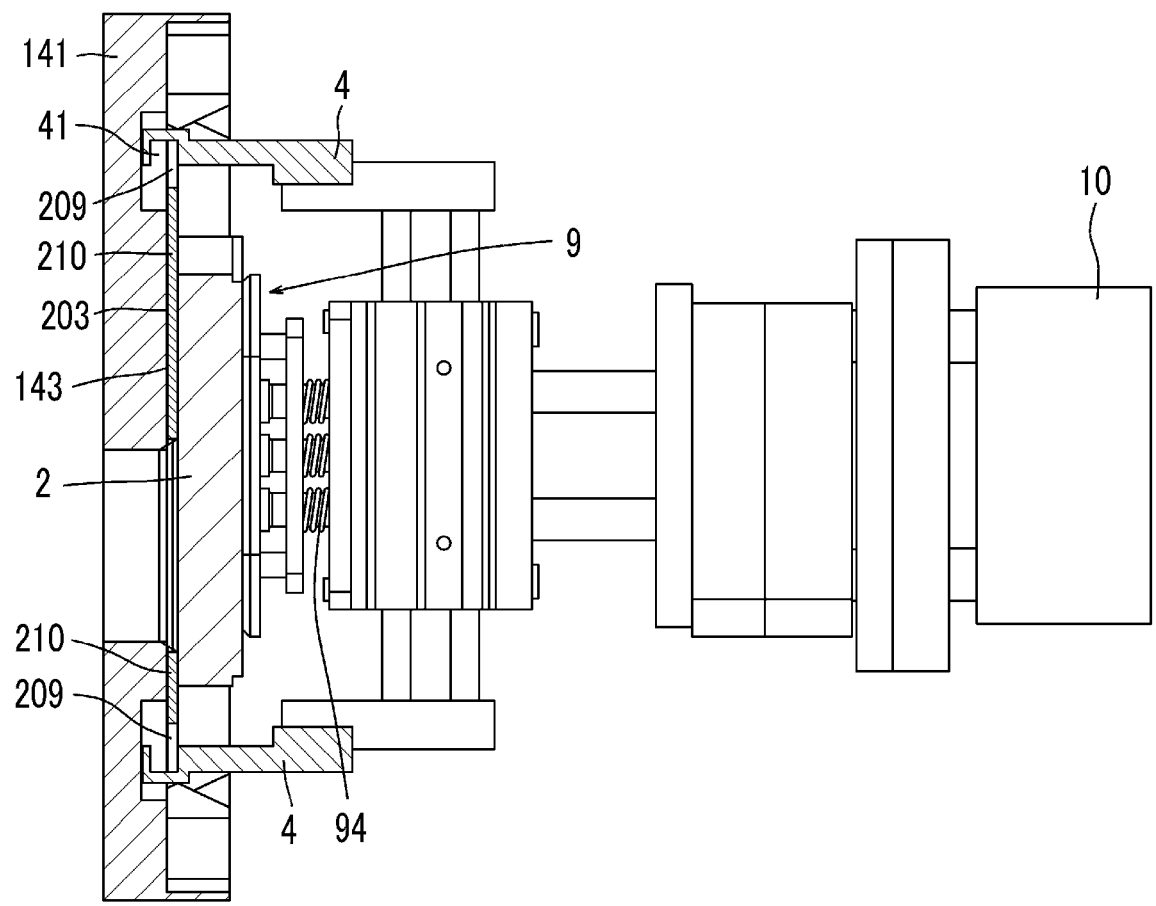
FIG. 7c is an explanatory diagram showing the positional relationship among the plate (upper plate), the plate holding device and the fixed metal frame (plate-receiving metal frame) in the third embodiment.
Figure 7D:
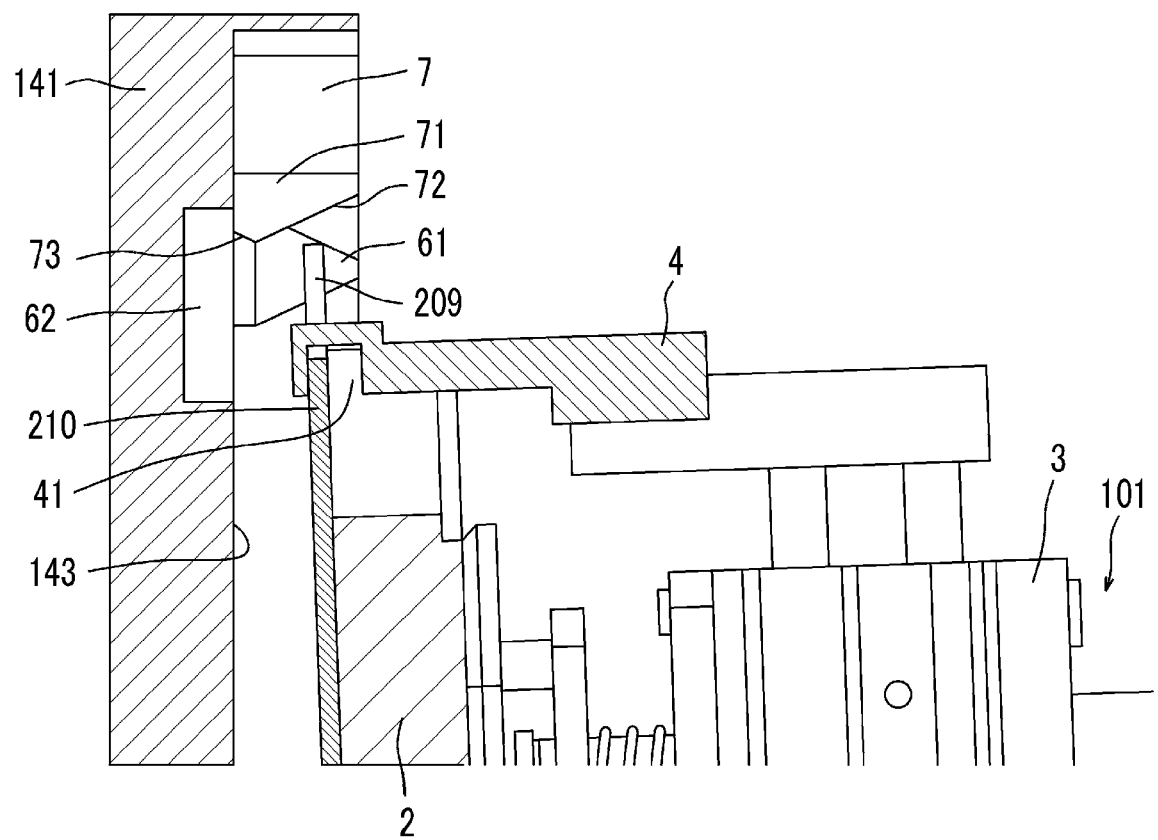

As shown in FIG. 7d, each of the lock mechanisms 7 comprises a holding block 71 movable in a direction parallel to the sliding direction of the plate via a spring (illustration is omitted). When each of the fixable portions 209 of the plate is moved toward the bottom surface 143 of the fixed metal frame 141 while contacting a first inclined surface 72 of the holding block 71 of a corresponding one of the lock mechanisms 7, the holding block 71 moves in a direction away from the plate. Then when the fixable portion 209 of the plate contacts a second inclined surface 73, the holding block 71 slightly moves toward the plate to lock the fixable portion 209 of the plate.

The bottom surface 143 of the fixed metal frame 141 has two recesses 62 each provided at a position corresponding to a respective one of the holding members 4 of the plate holding device 101 to allow the distal end of the holding member 4 to intrude therein. Each of the recesses 62 is set to a size which allows the distance between the holding members 4 of the plate holding device 101 to be widened and narrowed in a state in which the back plate 203 of the plate contacts the bottom surface 143 of the fixed metal frame 141.

Since mortar is used as a joint material between the upper plate and an upper nozzle, the upper plate is held by the plate holding device in a state in which mortar is applied onto the upper plate. Specifically, in FIG. 6, mortar is applied onto a raised portion 207 of the plate body 210 in an opening 204 of the back plate 203, and around the raised portion 207.

In FIG. 7a, the plate holding device 101 is moved toward the fixed metal frame 141, and each of the openings of the fixable portions 209 starts to be engaged with a respective one of the guide protrusions 61 of the fixed metal frame 141. From this state, the plate 2 is gradually moved toward the bottom surface 143 of the fixed metal frame 141 while being positionally adjusted between two sets of the engagement grooves 41 of the holding members 4 of the plate holding device 101 and the guide protrusions 61.

Then, as shown in FIG. 7b, when the back plate 203 of the plate 2 contacts the bottom surface 143 of the fixed metal frame 141, the force detected as a reaction force by the force sensor 10 starts to increase. When this force reaches a given threshold A, the movement of the plate holding device 101 is stopped once, and the distance between the holding members 4 is maximally widened.

In FIG. 7b, each of the upper engagement protrusions 210 of the plate contacts a base end-side inner wall surface of a corresponding one of the engagement grooves 41 of the upper holding member 4 of the plate holding device 101, and an upper portion of the back plate 203 of the plate contacts the bottom surface 143 of the fixed metal frame 141. On the other hand, the fixable portions 209 have not yet be completely locked by the lock mechanisms 7. Further, although not illustrated, the mortar between the plate 2 and the upper nozzle has not yet become a desired joint thickness. In this state, the upper holding member 4 cannot be moved toward the bottom surface 143 of the fixed metal frame 141 any more, and thereby a large reaction force is generated. Thus, the force detected by the force sensor 10 reaches the given threshold A.

When the force detected by the force sensor 10 reaches the given threshold A as described above, the movement of the plate holding device 101 is stopped once, and the distance between the holding members 4 of the plate holding device 101 is widened to release the plate 2, as shown in FIG. 7c. As a result, the engagement protrusions 210 of the plate become free from engagement with the holding members, and thereby the force detected by the force sensor 10 decreases. Subsequently, when the plate holding device 101 is further moved toward the fixed metal frame 141, the plate can be pressed against the bottom surface 143 of the fixed metal frame 141 only by the pressing unit 9. In this process, the pressing unit 9 can be tilted in any direction via the coil springs 94. Thus, the back plate 203 of the plate 2 is placed in a posture parallel to the bottom surface 143 of the fixed metal frame 141, and the fixable portions 209 of the plate 2 are locked by the lock mechanisms 7. Further, although not illustrated, the fitting recesses of the plate fittingly receive the fitting protrusions provided on the plate-receiving metal frame.

As above, when the plate 2 is released, and then the plate holding device 101 is further moved toward the fixed metal frame 141 to press the plate against the bottom surface 143 of the fixed metal frame 141 only by the pressing unit 9, the force detected by the force sensor 10 starts to increase. Then, when this force reaches a given threshold B, the movement of the plate holding device 101 is stopped. Subsequently, the plate holding device 101 is moved in a direction away from the fixed metal frame 141, while leaving the plate in the fixed metal frame 141. In this way, the plate 2 is attached to the fixed metal frame 141.

Here, the distance between the holding members 4 widened during releasing of the plate is preferably set to allow the engagement protrusions 210 of the plate 2 to completely get out of the engagement grooves 41 of the holding members 4 of the plate holding device 101, as shown in FIG. 7c. Specifically, a distance between respective inner surfaces 42 of the holding members in a widening and narrowing direction as shown in FIG. 5 may be set to be greater than a distance between respective outer surfaces 210a of the opposite engagement protrusions 210 in the sliding direction of the plate as shown in FIG. 6.

However, a gap is provided between each of the engagement grooves 41 of the holding members 4 and a corresponding one of the engagement protrusions 210 of the plate 2. Thus, considering displacement of the plate within the range of the gap, the distance between the inner surfaces 42 of the holding members 4 in the widening and narrowing direction may be set to be greater than a sum of the distance between the outer surfaces 210a of the opposite engagement protrusions in the sliding direction of the plate and the length of the gap.

For example, in the third embodiment, the gap between each of the engagement grooves 41 of the holding members 4 and a corresponding one of the engagement protrusions 210 of the plate 2 is initially set to 5 mm on one side. Therefore, the distance between the inner surfaces 42 of the holding members 4 of the plate holding device 101 in the widening and narrowing direction may be set to be greater than 310 mm obtained by adding 10 mm which is the gap on both sides to 300 mm which is the distance between the outer surfaces 210a of the opposite engagement protrusions in the sliding direction of the plate. In the third embodiment, it is set to 350 mm.

On the other hand, if the distance between the holding members 4 widened during releasing of the plate is excessively large, the holding members 4 are likely to contact the fixed metal frame 141, resulting in failing to smoothly move the plate holding device. Thus, this distance may be set to a value to the extent that can avoid such a contact.

The aforementioned threshold A of the force detected by the force sensor is determined depending on use conditions, because it depends on the size of the plate, whether or not mortar is used, or the hardness of mortar when it is used. If the threshold A is excessively small, the plate is likely to drop when the distance between the holding members is widened to release the plate. Although there is no particular problem with setting the threshold A to a fairly large value, it is necessary to increase the strength of the plate and the plate holding device, resulting in an increase in unprofitable cost. For example, there is no problem with setting the threshold A such that the entire back plate 203 of the plate becomes a state in which it fully contacts the bottom surface 143 of the fixed metal frame 141, at the time when a force equal to the threshold A is measured. Therefore, the threshold A is preferably set such that the plate is moved toward the bottom surface of the fixed metal frame 141 until it is engaged with the guide protrusions 61 or the lock mechanisms 7 to some extent so as not to drop. Considering the above, the threshold A may be adequately set in the range of 50 N to 3000 N.

Further, the aforementioned threshold B of the forth detected by the force sensor is set to be equal to or greater than the threshold A set such that the plate becomes a state in which it is locked by the lock mechanisms so as not to drop. Although there is no particular problem with setting the upper limit of the threshold B to a fairly large value, as with the threshold A, it is necessary to increase the strength of the plate and the plate holding device, resulting in an increase in unprofitable cost.

Fourth Embodiment

Figure 8:
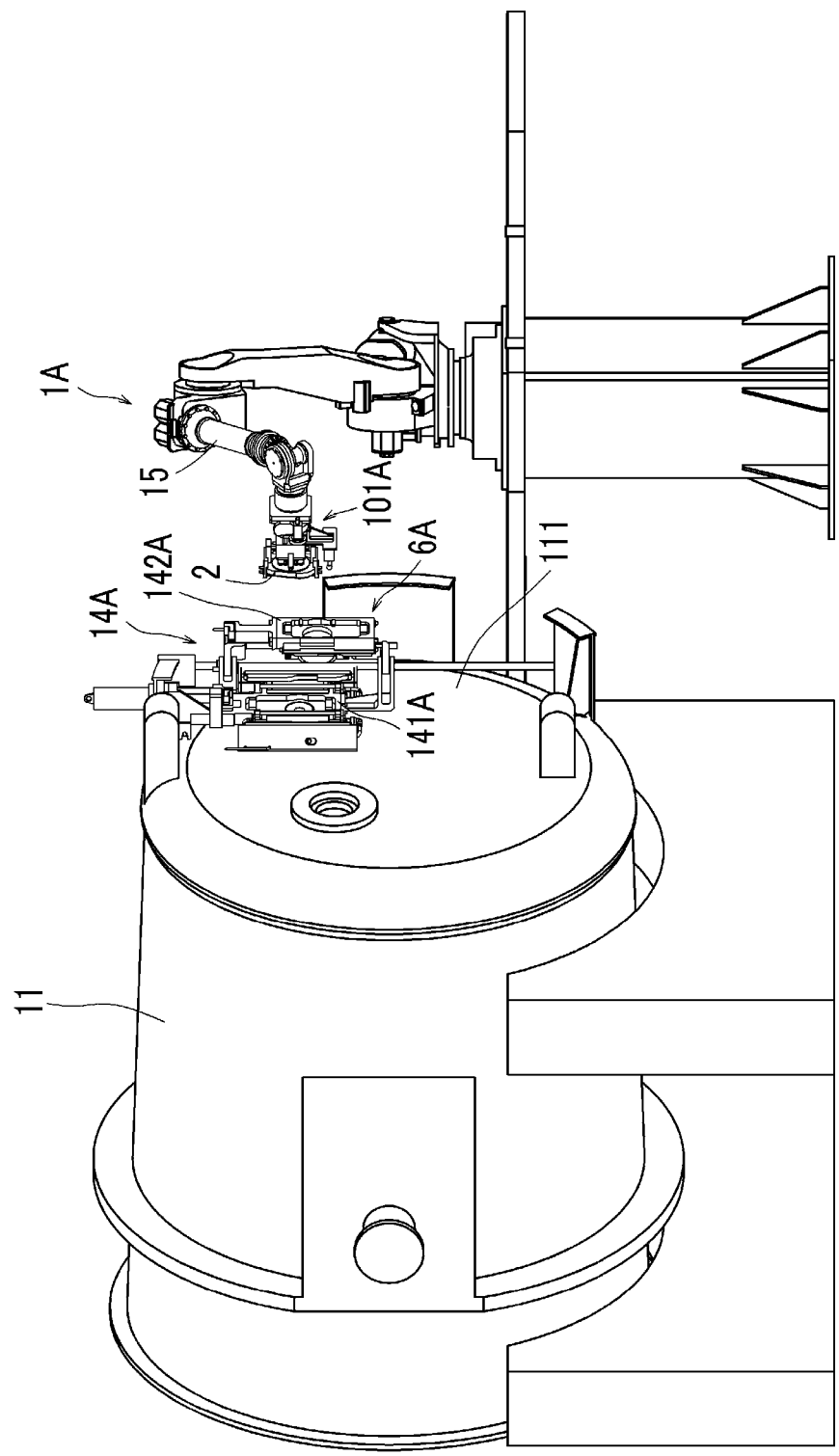
FIG. 8 is an explanatory diagram showing a usage state of a plate attaching-detaching apparatus according to a fourth embodiment of the present invention.

FIG. 8 is an explanatory diagram showing a usage state of a plate attaching-detaching apparatus according to a fourth embodiment of the present invention. As shown in FIG. 8, the plate attaching-detaching apparatus 1A is obtained by mounting a plate holding device 101A to a robot arm 15. This plate attaching-detaching apparatus 1A is configured to selectively attach and detach a plate 2 with respect to a plate-receiving metal frame assembly 6A of a sliding nozzle device 14A provided on, e.g., the bottom 111 of a ladle 11.

Figure 9:
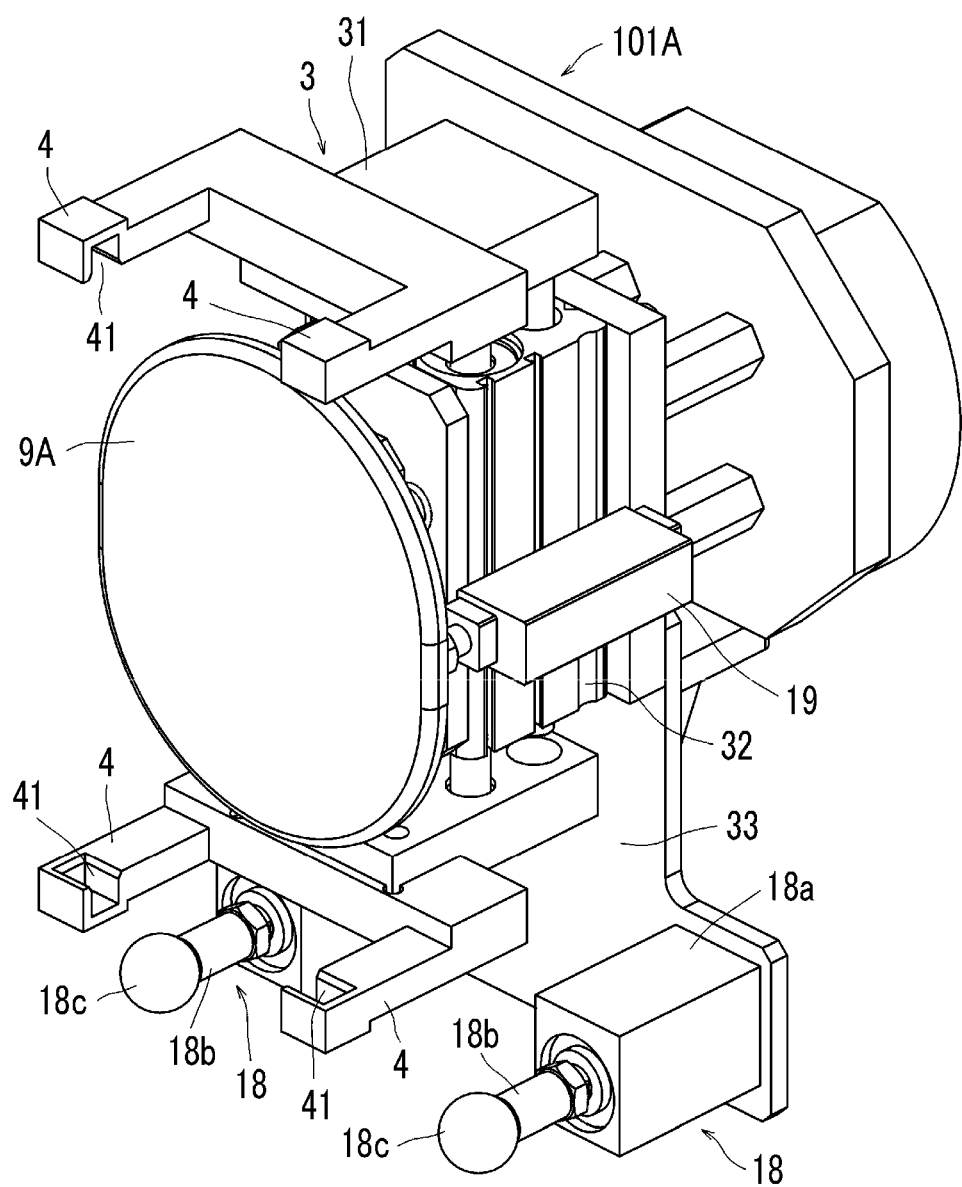
FIG. 9 is a perspective view of a plate holding device in the fourth embodiment.

FIG. 9 is a perspective view of the plate holding device 101A in the fourth embodiment. As shown in FIG. 9, the plate holding device 101A in the fourth embodiment comprises a pressing mechanism 18 and a vibration mechanism 19. The configuration of the plate holding device 101A in the fourth embodiment is the same as that of the plate holding device 101 in the third embodiment, except for the pressing mechanism 18 and the vibration mechanism 19, and therefore description of the common configuration will be omitted.

Figure 10:
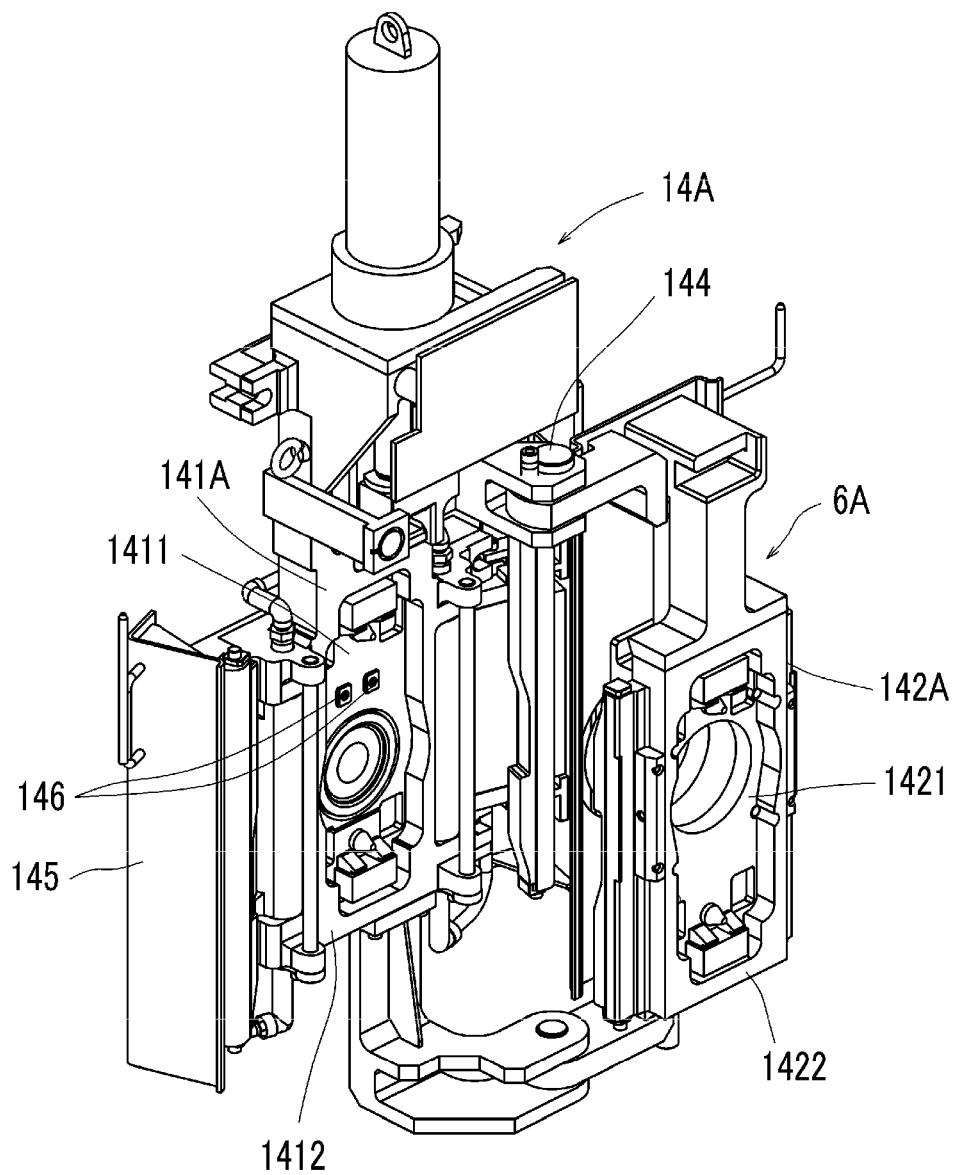
FIG. 10 is a perspective view of a sliding nozzle device in a state in which a swingable metal frame is opened.
Figure 11:
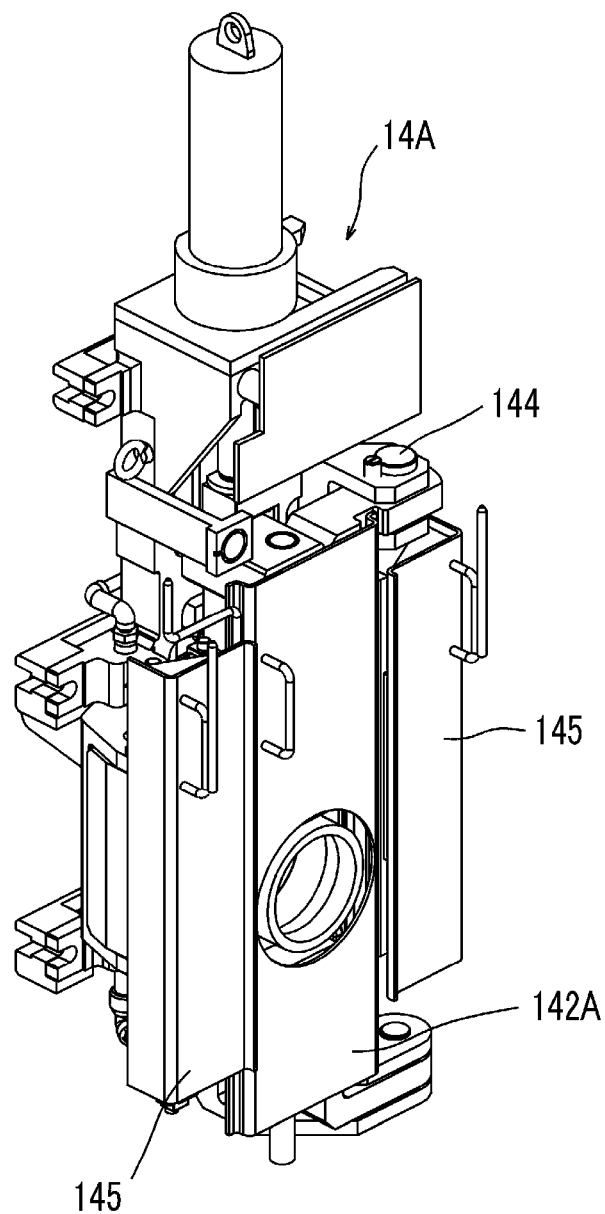
FIG. 11 is a perspective view of the sliding nozzle device in a state in which the swingable metal frame is closed.

FIGS. 10 and 11 are perspective view of the sliding nozzle device 14A.

The sliding nozzle device 14A comprises the plate-receiving metal frame assembly 6A and a spring box 145. The plate-receiving metal frame assembly 6A comprises a fixed metal frame 141A and a swingable metal frame 142A, in each of which a plate (not illustrated) is received. The swingable metal frame 142A is provided such that it is swung about a pivot shaft 144 with respect to the fixed metal frame 141A in an openable closable manner. The swingable metal frame 142A in the fourth embodiment is slidably provided with respect to the fixed metal frame 141A. That is, the swingable metal frame 142A in the fourth embodiment is equivalent to a sliding metal frame (the sliding metal frame 142 in the third embodiment).

A plate replacement operation is performed in a state in which the swingable metal frame 142A is opened with respect to the fixed metal frame 141A. During this operation, the swingable metal frame 142A may be configured to be swingable in a closing direction, or a mechanism for fixing the swingable metal frame 142A immovably in the closing direction may be employed separately.

The spring box 145 of the sliding nozzle device 14A is used to load a surface pressure to the plate-receiving metal frame assembly 6A during use of the sliding nozzle device 14A to hold the plate-receiving metal frame assembly 6A in a closed state.

Each of the fixed metal frame 141A and the swingable metal frame 142A has a receiving portion (1411, 1421) in which the plate is to be received, and an outer surface (1412, 1422) forming an outer shape of the metal frame. Further, each of the receiving portions 1411, 1421 is formed with two fitting protrusions 146 onto each of which a respective one of two fitting recesses 212 (see FIG. 18) of the plate 2 is to be fitted.

The remaining configurations of the fixed metal frame 141A and the swingable metal frame 142A are the same as those of the fixed metal frame 141 and the sliding metal frame 142 in the third embodiment, and therefore description thereof will be omitted.

Next, the pressing mechanism 19 provided in the plate holding device 101A will be described.

As shown in FIG. 9, the pressing mechanism 18 comprises a pressing mechanism body 18a, a moving part 18b coupled to the pressing mechanism body 18a, and a spherical-shaped contact part 18c provided at a distal end of the moving part 18b.

The pressing mechanism 18 is provided on a mounting plate 33 extending downwardly from a gripper body 33 of the plate holding device 101A. The pressing mechanism 18 is disposed below a pair of holding members 4 by a number of two. The moving part 18b is provided such that it is extendable and retractable (movable forwardly and backwardly), with respect to an end of the pressing mechanism body 18a. Further, the moving part 18b is disposed to extend forwardly (in a direction toward the swingable metal frame) from the end of the pressing mechanism body 18a.

When the moving part 18b is retracted, the contact part 18c is disposed on the side of the gripper body 32 with respect to distal ends of the holding members 4. This arrangement makes it possible to prevent a situation where, when the holding members 4 are inserted into the swingable metal frame 142A, the contact part 18c is brought into contact with the swingable metal frame 42A before the holding members 4 reaches a region in which the plate is received. That is, the contact part 18c is disposed at a position where, when the holding members 4 are inserted into the swingable metal frame 142A, a gap is formed between the swingable metal frame and the contact part 18c, and thereby the contact part 18c does not become an obstacle to the insertion of the holding members 4.

The moving part 18b may be configured to be extended such that the contact part 18c protrudes with respect to the distal ends of the holding members 4. In the fourth embodiment, the two pressing mechanisms 10 are provided at bilaterally symmetrical positions with respect to a vertical central axis of the plate holding device 101A.

Although not illustrated, the pressing mechanism body 18a of the pressing mechanism 18 is internally provided with a drive mechanism such as an electromagnetic pneumatic valve or an electric motor. According to electric control of the drive mechanism, the moving part 18b can be controllably extended and retracted. Further, according to electric control of the drive mechanism, a plate holding operation of the holding members of the plate holding device 101A and the movement of the robot arm can be interlocked with the extending and retracting operations of the moving part 18b.

The plate attaching-detaching apparatus 1A comprising the plate holding device 101A with the pressing mechanism 18 operates as follows.

Figure 12:
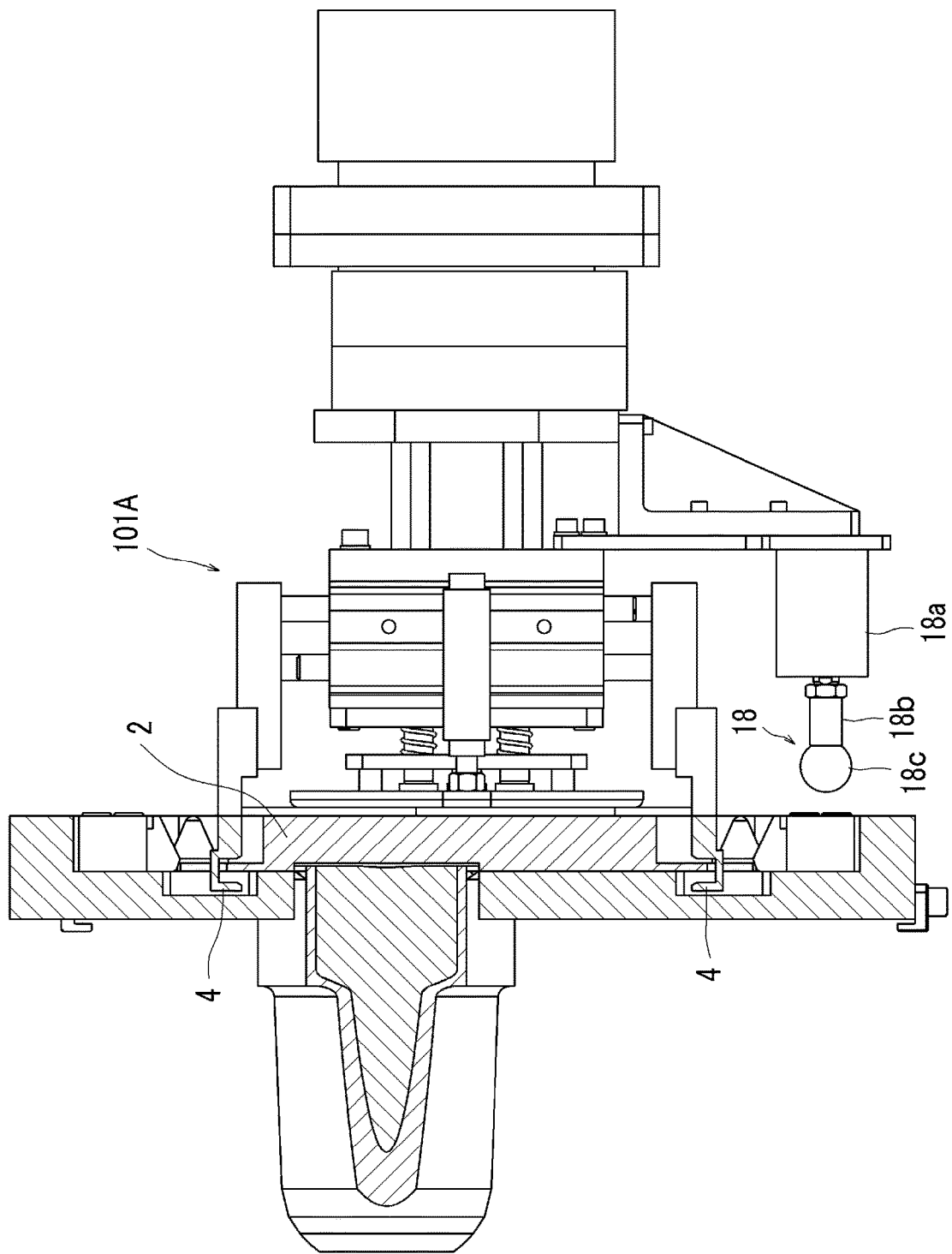
FIG. 12 is an explanatory diagram showing a state in which the plate holding device in the fourth embodiment holds a plate received in the swingable metal frame.
Figure 13A:
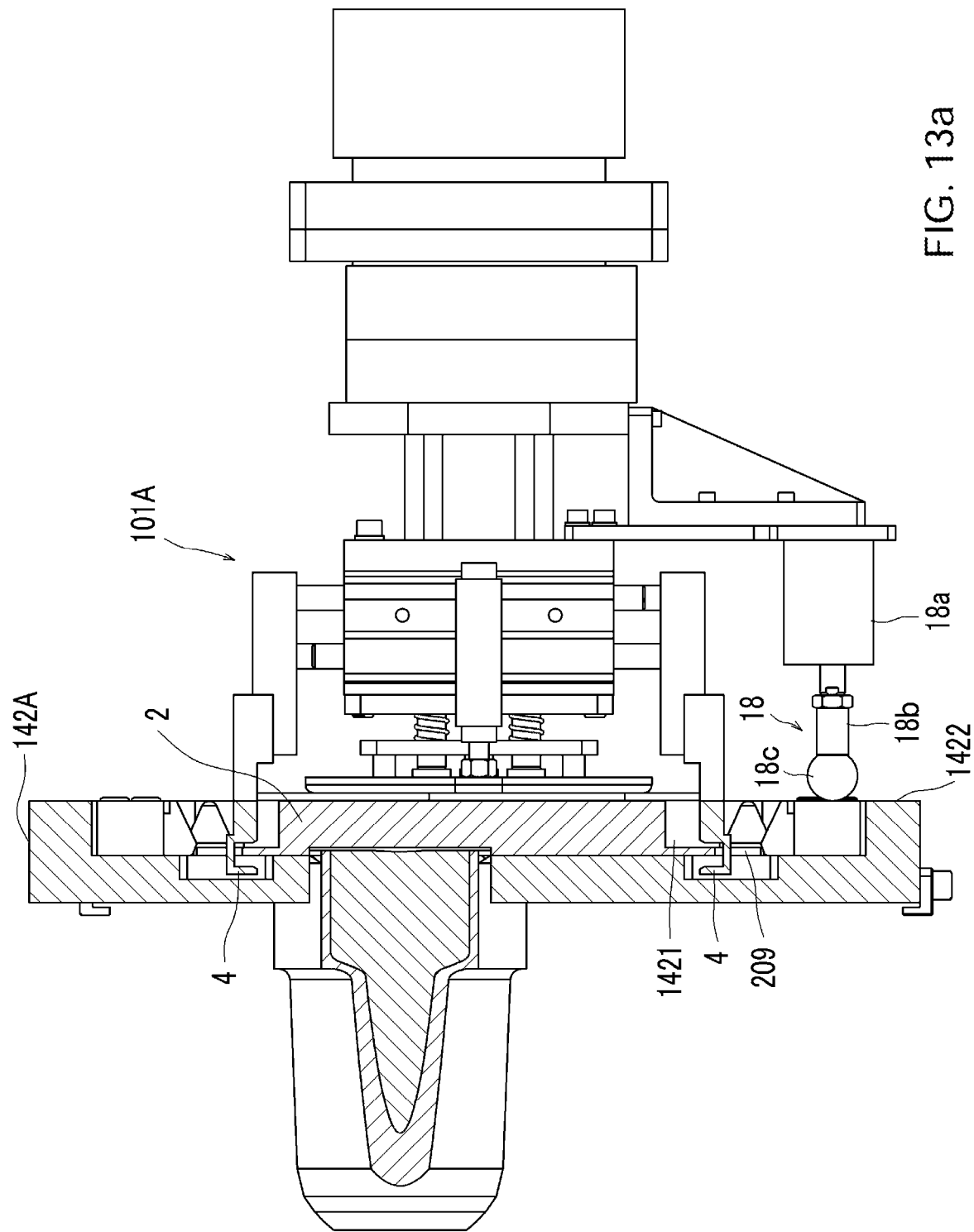
FIG. 13a is an explanatory diagram showing a state in which the plate holding device in the fourth embodiment presses the swingable metal frame by a pressing mechanism thereof (a first mode in which the swingable metal frame is not tilted).

First of all, the robot arm 15 is operated to insert the holding members 4 of the plate holding device 101A into the plate receiving portion 1421 of the swingable metal frame 142A. Then, the holding members 4 of the plate holding device 101A are moved to hold the plate 2, as shown in FIG. 12. Then, in a first mode, the moving part 18b is extended in a state in which the holding members 4 4 hold the plate 2, as shown in FIG. 13a. Thus, the contact part 18c presses a lower end region of the outer surface 1422 of the swingable metal frame 142A. In conjunction with the operation of extending the moving part 18b, the robot arm 15 is moved in a direction away from the swingable metal frame 142A. In this process, since swinging movement of the swingable metal frame 142A in the closing direction is inhibited by the extended contact part 18c, the holding members 4 can be pulled out of the receiving portion 1421 of the swingable metal frame 142A.

Until engagement between each of two upper and lower fixable portions 209 of the plate 2 and the swingable metal frame 142A is completely released, the moving part 18b continues to be extended to hold the state in which the contact part 18c contacts the outer surface 1422 of the swingable metal frame 142A. In this way, based on the operation of the robot arm 15, the holding members 4 of the plate holding device 101A are moved outside the receiving portion 1421 of the swingable metal frame 142A to detach the plate 2.

As above, the first mode illustrated in FIG. 13a is a mode in which the plate 2 is detached without tilting the swingable metal frame 142A. Alternatively, as shown in FIG. 13b, it is possible to employ a second mode in which the lower end region of the outer surface 1422 of the swingable metal frame 142A is pressed by the pressing mechanism 18 so as to tilt the swingable metal frame 142A, thereby releasing a lower lock mechanism 7 of the swingable metal frame 142A, and disengaging the lower fixable portion 209 of the plate 2 from the swingable metal frame 142A.

Figure 13B:
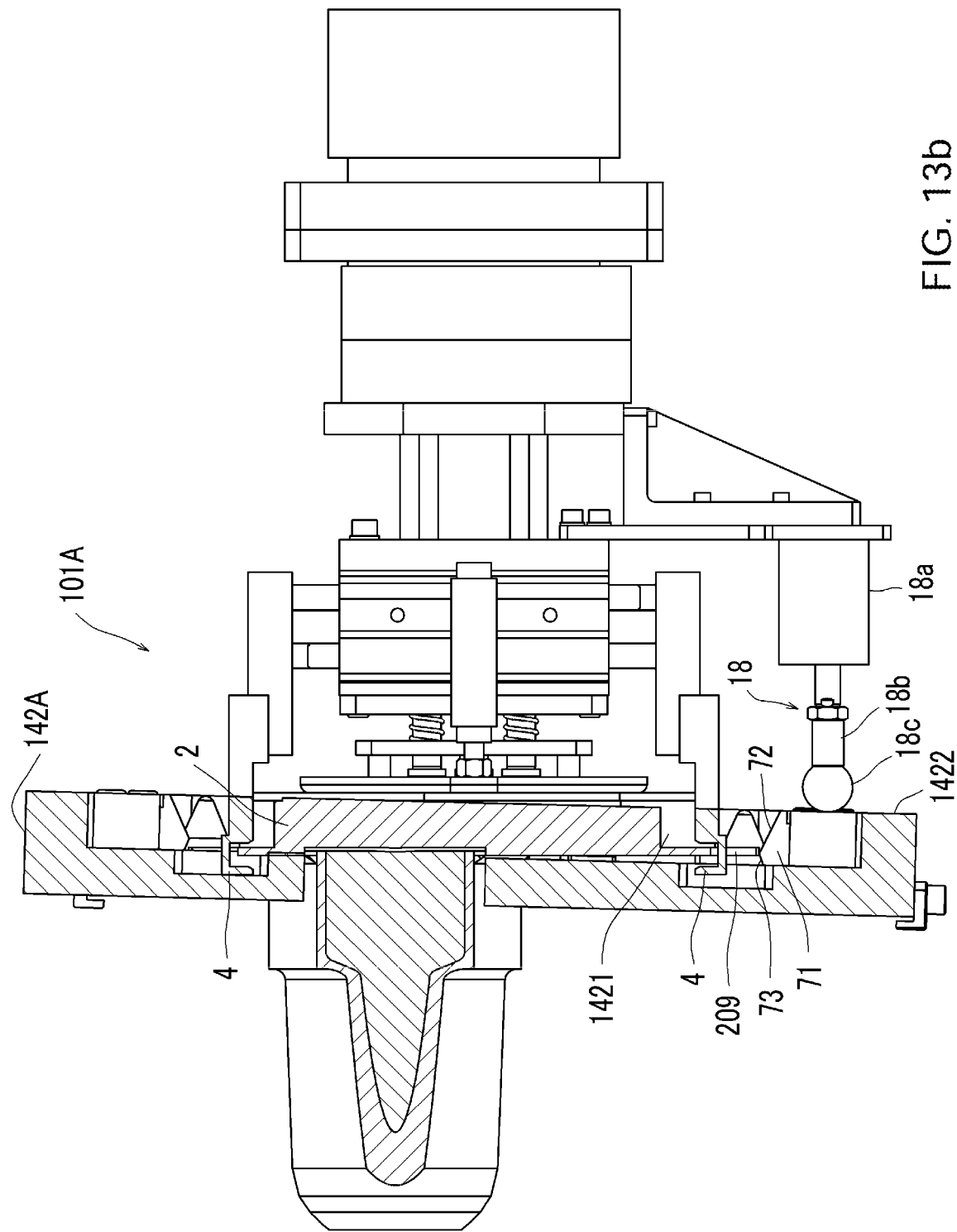
FIG. 13b is an explanatory diagram showing a state in which the plate holding device in the fourth embodiment presses the swingable metal frame by the pressing mechanism (a second mode in which the swingable metal frame is tilted).

Specifically, in the second mode, the moving part 18b is extended in the state in which the holding members 4 hold the plate 2, as shown in FIG. 13b. Thus, the contact part 18c presses the lower end region of the outer surface 1422 of the swingable metal frame 142A to release engagement between the lower fixable portion 209 of the plate 2 and the swingable metal frame 142A. In conjunction with the operation of extending the moving part 18b, the robot arm 15 is moved in the direction away from the swingable metal frame 142A to pull out the holding members 4 from the receiving portion 1421 of the swingable metal frame 142A. Until engagement between the upper fixable portion 209 of the plate 2 and the swingable metal frame 142A is completely released, the moving part 18b continues to be extended to hold the state in which the contact part 18c contacts the outer surface 1422 of the swingable metal frame 142A. In this way, based on the operation of the robot arm 15, the holding members 4 of the plate holding device 101A are moved outside the receiving portion 1421 of the swingable metal frame 142A to detach the plate 2.

In the second mode, the pressing mechanism 18 presses the lower end region of the outer surface 1422 of the swingable metal frame 142A. Thus, the pressed lower portion of the swingable metal frame 142A is moved rearwardly, so that the swingable metal frame 142A is leaned (tilted) frontwardly with respect to the holding members 4 of the plate holding device 101A. In this process, the lower fixable portion 209 of the plate 2 located on a second inclined surface 73 of the after-mentioned holding block 71 of the lower lock mechanism 7 is moved to a first inclined surface 72 of the holding block 71 over the second inclined surface 73. Therefore, the engagement between the lower fixable portion 209 of the plate 2 and the swingable metal frame 142A is released. Further, in conjunction with the operation of pressing the swingable metal frame 142A by the pressing mechanism 18, the robot arm 15 is moved in a direction away from the receiving portion 1421 of the swingable metal frame 142A. In this way, it is possible to detach the plate from the swingable metal frame 142A.

In either of the first mode and the second mode, the swingable metal frame 142A is placed in a state in which the swinging movement thereof in the closing direction is inhibited to some extent by the contact part 18c, and the swinging movement of the swingable metal frame 142A in the closing direction is inhibited by the extended contact part 18a, so that it is possible to reliably detach the plate 2 from the swingable metal frame 142A by the robot arm 15.

In the fourth embodiment, the robot arm 15 is moved in the direction away from the swingable metal frame 142A, thereby detaching the plate 2 from the swingable metal frame 142A. Alternatively, for example, the holding members 4 of the plate holding device 101A may be configured to be movable forwardly and backwardly with respect to the swingable metal frame 142A, wherein the plate 2 may be detached from the swingable metal frame 142A by moving the holding members 4 in the direction away from the receiving portion 1421 of the swingable metal frame 142A.

In the fourth embodiment, the operation of extending the moving part 18b and the operation of moving the robot arm 15 in the direction away from the swingable metal frame 142A are simultaneously performed. Alternatively, the plate attaching-detaching apparatus may be configured such that only the moving part 18b is first extended, and, after the contact part 18c is brought into contact with the swingable metal frame 142A, the robot arm 15 is moved in the direction away from the swingable metal frame 142A.

The pressing mechanism 18 in the fourth embodiment may be configured to perform control of opening the swingable metal frame 142A to a given position. In this case, in a situation where the swingable metal frame 142A is not located at the given position when the swingable metal frame 142A is opened, the pressing mechanism 18 can press the swingable metal frame 142A so as to swingingly move the swingable metal frame 142A to the given position.

In the fourth embodiment, the pressing mechanism 18 is provided below the holding members 4 in the plate holding device 101A. Alternatively, the pressing mechanism 18 may be provided above the holding members 4 or provided beside (on the right or left side of) the holding members 4, as long as it is configured to be capable of pressing the swingable metal frame 142A. Further, in the fourth embodiment, the two pressing mechanisms 18 are provided only below the holding members 4. Alternatively, the pressing mechanism 18 may be provided both above and below the holding members 4, or may be provided below and beside, or above and beside, or above, below and beside the holding members 4, respectively. Further, the pressing mechanism 18 is preferably configured to press one of opposite ends of the swingable metal frame 142A corresponding to the lock mechanisms 7. In the swingable metal frame 142A in the fourth embodiment, two lock mechanism 7 for the plate 2 is provided, respectively, at upper and lower ends the swingable metal frame 142A. Thus, the pressing mechanism 18 is preferably configured to press one of the upper and lower ends of the swingable metal frame 142A so as to release the engagement between the plate 2 and the swingable metal frame 142A. Further, the two pressing mechanisms 18 are preferably provided at symmetrical positions with respect to the holding members 4. Although the pressing mechanism 18 is preferably provided by a number of two like the fourth embodiment, it may be provided by a number of only one or three or more.

Although the contact part 18c is preferably formed in a spherical shape so as to cope with surface irregularity of the swingable metal frame 142A, it may take any of various other shapes such as a plate shape, a cubic shape or a rectangular parallelepiped shape.

In the fourth embodiment, the moving part 18b is configured to be driven in an extendable and retractable manner. Alternatively, for example, the moving part 18b may be configured to be biased using a spring or the like in a direction along with the moving part 18b is extended. In this case, the contact part 18c may be initially disposed to protrude with respect to the distal ends of the holding members 4. Thus, when the contact part 18c is brought into contact with the swingable metal frame 142A, the contact part 18c can bias the swingable metal frame 142A in the open direction. Further, when the holding members 4 are inserted into the swingable metal frame 142A, the spring is contracted, the pressing mechanism 18 does not become an obstacle to the insertion of the holding members 4.

In the fourth embodiment, the swingable metal frame 142A is swingably provided to the fixed metal frame 141A, and the plate 2 is fixed by the lock mechanisms 7 of the swingable metal frame 142A. Further, in the fourth embodiment, each of the lock mechanisms 7 of the swingable metal frame 142A comprises a holding block 71 movable forwardly and backwardly with respect to the receiving portion 1421 of the swingable metal frame 142A, and a spring (not illustrated) biasing the holding block 71 toward the inward side of the swingable metal frame 142A. Here, when the plate 2 received in the receiving portion 1421 of the swingable metal frame 142A is held by the holding members 4 of the plate holding device 101A, and, in this state, the robot arm 15 is moved in the direction away from the swingable metal frame 142A, there can occur a situation where, due to an excessively strong biasing force of the spring, the fixable portions 209 of the plate 2 cannot be moved from the second inclined surface 73 to the first inclined surface 72. In this situation, since the lock mechanisms 7 for the plate 2 are not released, the swingable metal frame 142A is likely to be followingly swung in a moving direction of the robot arm 15. Therefore, in the fourth embodiment, the plate holding device is configured such that, during the operation of detaching the plate 2, the pressing mechanism 18 contacts the outer surface 1422 of the swingable metal frame 142A.

According to this configuration, the pressing mechanism 18 can press the swingable metal frame 142A in an immovable manner, thereby inhibiting the swingable metal frame 142A from following the movement of the robot arm 15.

In the fourth embodiment, the pressing mechanism 18 is operated, in the second mode, to press the lower end region of the outer surface 1422 of the swingable metal frame 142A to tilt the swingable metal frame 142A, thereby releasing the lower lock mechanism 7 of the swingable metal frame 142A, and disengaging the lower fixable portion 209 of the plate 2 from the swingable metal frame 142A. In this way, the lock mechanisms 7 are partially released by the pressing mechanism 18, so that it becomes easier for the robot arm 15 to detach the plate 2. By tilting the swingable metal frame 142A in the above manner, it is possible to obtain the same effect of operation of pulling out the plate 3 while pulling the plate 2 downwardly to push the holding block 71 by the lower fixable portion 209 (the lower fixable portion 209 can be moved from the second inclined surface 73 to the first inclined surface 72).

It should be understood that, in the mode in which the swingable metal frame 142A is not tilted (first mode), the plate 2 can also be detached from the swingable metal frame 142A without any problem, as mentioned above.

The fourth embodiment has been described based on an example where the plate-receiving metal frame assembly is configured to receive two plates. However, there has also been known a plate-receiving metal frame assembly configured to receive three plates. In this case, the plate-receiving metal frame assembly comprises two swingable metal frames, wherein the pressing mechanism 18 in the fourth embodiment may be used when a plate is detached from each of these swingable metal frames.

In the fourth embodiment, the plate holding device 101A is configured to hold a plate 2 comprising a back plate 203 disposed on a back surface of a plate body 201, and, in this state, selectively attach and detach the plate 2 with respect to the swingable metal frame. Alternatively, the plate holding device may be configured to hold a commonly-used plate devoid of the back plate as disclosed in the Patent Document 2, and in this state, selectively attach and detach the plate with respect to the swingable metal frame.

Next, the vibration mechanism 19 (vibration unit) comprised in the plate holding device 101A will be described.

Figure 14:
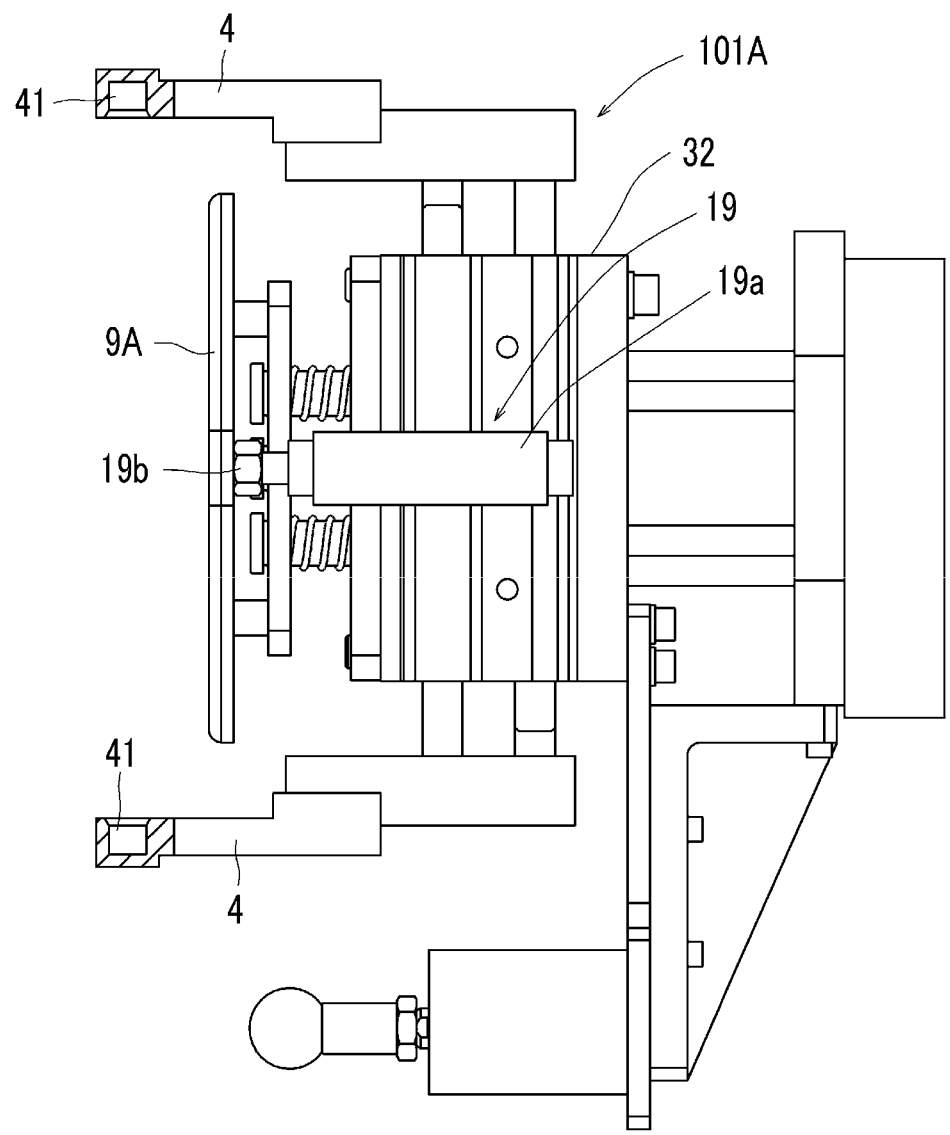
FIG. 14 is a side view of the plate holding device in the fourth embodiment (wherein only holding members are shown in cross-section).

As shown in FIG. 14, the vibration mechanism 19 comprises a vibration mechanism body 19a provided on a lateral surface of the gripper body 32 of the plate holding device 101A, and a vibration applicator 19b provided at a distal end of the vibration mechanism 19a. The vibration mechanism 19 is provided by a number of two on the right and left sides of the holding members 4 of the plate holding device 101A. The vibration mechanism body 19a is internally provided with a vibrating device (not illustrated) such as a vibrating motor. The vibrating device is configured such that start and stop of vibration can be electrically controlled. The vibration mechanism body 19a is vibrated by vibrating the vibrating device. The vibration of the vibration mechanism body 19a is transmitted to the vibration applicator 19b. The vibration applicator 19b contacts a back surface of a pressing unit 9A, and is capable of transmitting vibration to the pressing unit 9A. A vibration direction of the vibration applicator 19b may be set to a direction horizontal to the pressing unit 9A. However, in this case, the vibration applicator 19b is likely to be displaced in the vibration direction, causing a change in position where vibration is transmitted to the pressing unit 9A. Therefore, the vibration direction is preferably set to a direction perpendicular to the pressing unit 9A.

The vibration mechanism body 19a is vibrated when the pressing unit 9A of the plate holding device 101A presses the plate 2. This vibration is transmitted from the vibration applicator 19b to the plate 2 via the pressing unit 9A. In other words, the plate 2 can be vibrated by vibrating the vibration mechanism body 19a.

The plate attaching-detaching apparatus 1A comprising the plate holding device 101A with the vibration mechanism 19 operates as follows.

Figure 15:
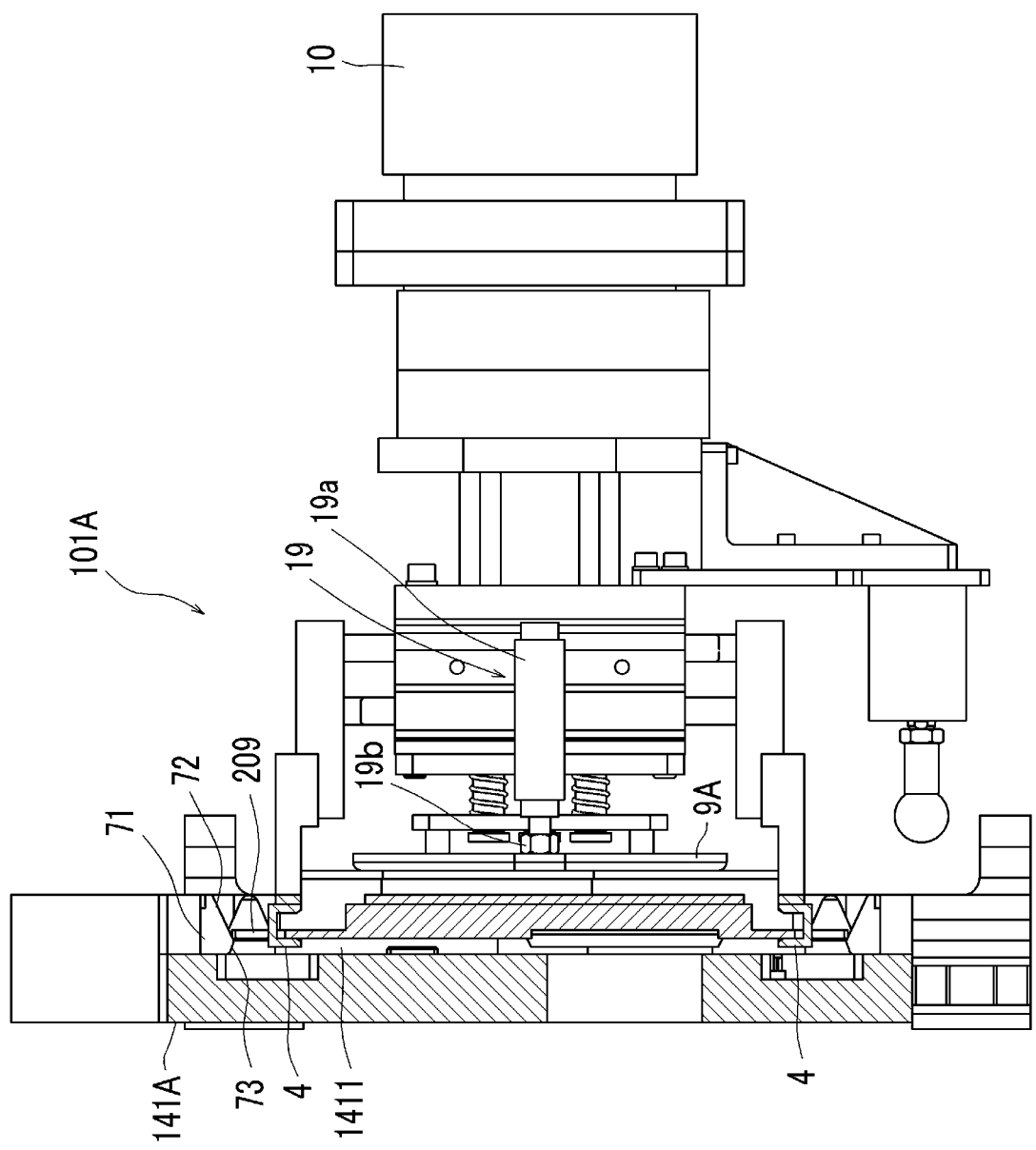
FIG. 15 is an explanatory diagram showing a state in which the plate holding device in the fourth embodiment is operated to move a plate closer to a fixed metal frame.
Figure 16:
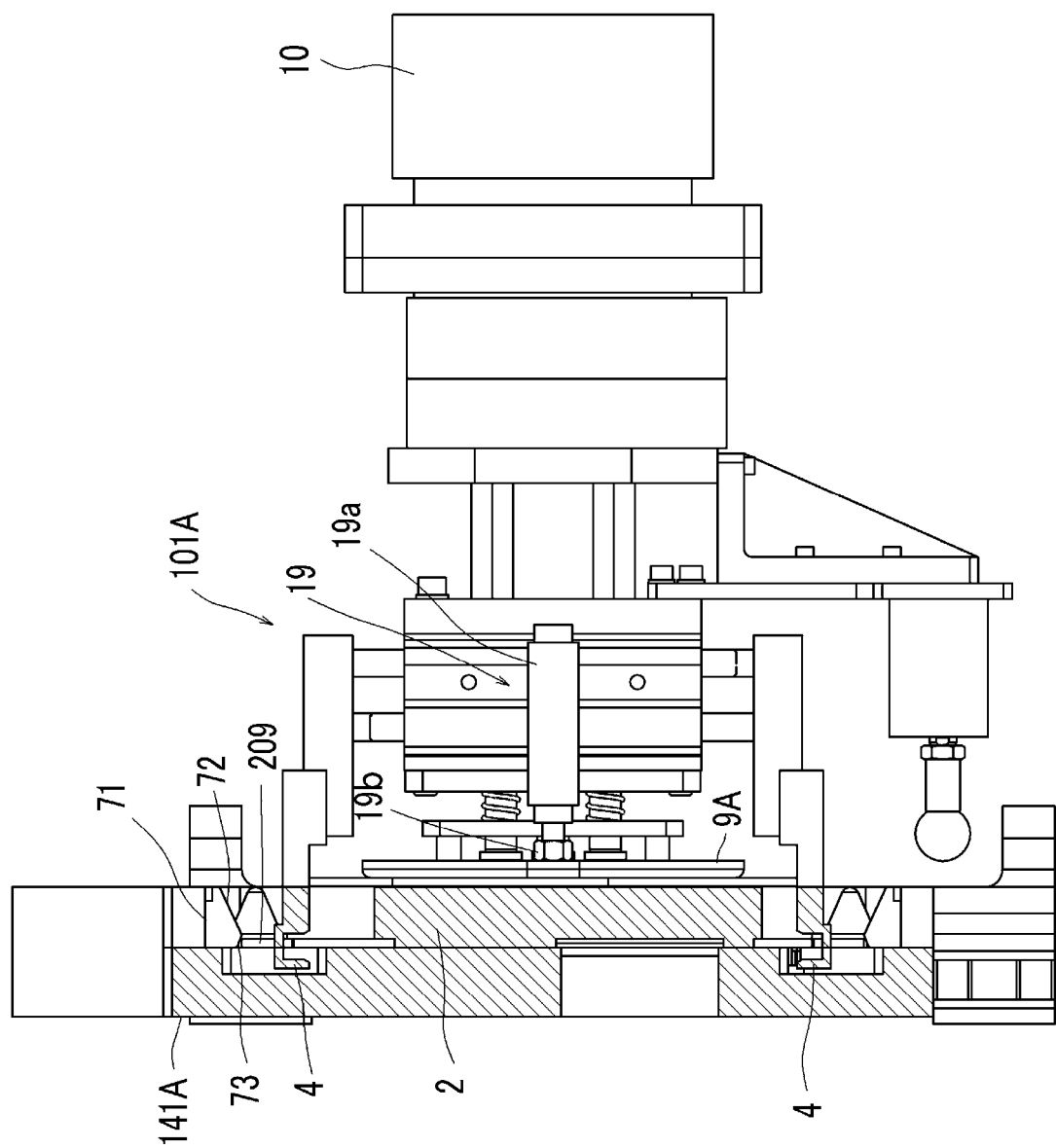
FIG. 16 is an explanatory diagram showing a state in which the plate holding device in the fourth embodiment has completed fittingly attaching the plate to the fixed metal frame.

First of all, the holding members 4 of the plate holding device 101A are moved to hold the plate 2. Then, as shown in FIG. 15, the robot arm 15 is operated to insert the holding members 4 holding the plate 2 into the receiving portion 1411 of the fixed metal frame 141A. When the plate 2 is brought into contact with the after-mentioned holding blocks 71 of the fixed metal frame 141A, and a force detected by a force sensor 10 reaches a given threshold A, the operation of inserting the holding members 4 by the robot arm 15 is stopped. Then, a distance between the holding members 4 is widened to release the plate 2. Then, the robot arm 15 is moved in a direction coming closer to the fixed metal frame 141A to press the plate 2 by the pressing unit 9A, and the vibration mechanism body 19a is vibrated. Then, as shown in FIG. 16, when the fixable portions 209 of the plate 2 are locked by the after-mentioned lock mechanisms 7 of the fixed metal frame 141A, and the force detected by the force sensor 10 reaches a given threshold B, the vibration of the vibration mechanism body 19a is stopped.

Here, there is a possibility that, when the force detected by the force sensor 10 reaches the given threshold B, the fixable portions 209 of the plate 2 have not yet been locked by the lock mechanisms 7 of the fixed metal frame 141A. Therefore, the vibration mechanism body 19a may continue to be vibrated for several seconds after the force detected by the force sensor 10 reaches the given threshold B. This makes it possible to more reliably lock the fixable portions 209 of the plate 2 by the lock mechanisms 7.

In the fourth embodiment, when the plate 2 is brought into contact with the holding blocks 71 of the fixed metal frame 141A, and the force detected by the force sensor 10 reaches the given threshold A, the operation of inserting the holding members 4 by the robot arm 15 is stopped. Alternatively, for example, a position toward which the holding members 4 should be moved to approach the fixed metal frame 141A may be preliminarily set, and the plate attaching-detaching apparatus may be configured such that, when the holding members 4 reach the preset position, the distance between the holding members 4 are widened to release the plate 2, and the pressing of the plate 2 by the robot arm 15 and the vibration of the vibration mechanism body 19a are started.

Although the fourth embodiment has been described based on an example where the plate 2 is attached to the fixed metal frame 141A, it should be understood that the plate 2 can be attached to the swingable metal frame 142A in a similar manner.

In the fourth embodiment, no vibration is applied to the holding members 4 (the holding members 4 are not positively vibrated). This is because, if the holding members 4 are vibrated during holding or insertion of the plate 2, the position of the plate 2 can become misaligned with respect to the receiving portion 1411, resulting in failing to adequately insert the plate 2.

Therefore, in the fourth embodiment, the vibration mechanism 19 (vibration unit) is provided separately from the holding members 4. Thus, even when the vibration mechanism 19 is vibrated, the holding members 4 are not vibrated.

In the fourth embodiment, the vibration mechanism 19 is provided by a number of two on right and left lateral surfaces of the gripper body 32 of the plate holding device 101A. Alternatively, the two vibration mechanisms may be provided, respectively, on upper and lower lateral surfaces of the gripper body 32. Further, the vibration mechanism 19 may be provided by a number of only one or may be provided by a number of three or more, as long as it is configured to evenly transfer vibration to the plate 2. Further, the vibration applicator 19b may be provided with a vibrating device and configured to vibrate by itself Although the fourth embodiment has been described based on an example where the vibration mechanism 19 is vibrated during the operation of fittingly attaching the plate 2, the vibration mechanism 19 may be used during detaching of the plate 2. During the operation of detaching the plate 2, there is a situation where substances adhered to the plate 2 such as iron, slag and mortar are solidified to cause difficulty in detaching the plate 2. In this situation, when the plate 2 received in the receiving portion 1411 is held by the holding members 4, the pressing unit 9A is brought into contact with the plate 2, and vibration is applied from the vibration mechanism 19 to the plate 2, thereby removing the adhered substances to facilitate detaching of the plate 2.

In the fourth embodiment, the fixed metal frame 141A is provided with two lock mechanisms 7 for locking the plate 2. Each of the lock mechanisms 7 comprises a holding block 71 movable forwardly and backwardly with respect to the inside of the fixed metal frame 141A, and a spring (not illustrated) biasing the holding block 71 toward the inward side of the swingable metal frame 142A. The holding block has a first inclined surface 72 and a second inclined surface 73.

When the plate 2 is fittingly attached to the fixed metal frame 141A, the robot arm 15 needs to be moved in a direction causing the plate 2 to be pressed against the holding blocks 71, in a state in which the fixable portions 209 of the plate 2 contact the first inclined surface 72 of the holding blocks 71. Through this operation, the fixable portions 209 of the plate 2 can be guided to the second inclined surface 73, while releasing the lock mechanisms 7 of the fixed metal frame 141A. However, there has been difficulty in performing delicate control of allowing the plate 2 to contact the first inclined surface by using only the robot arm 15.

The fixed metal frame 141A has fitting protrusions 146 corresponding to fitting recesses 212 of the plate 2. However, an attaching error of several mm arises in the operation of attaching the plate 2 by the robot arm 15, and thereby the fitting recesses 212 of the plate 2 fail to be fitted on the fitting protrusions 146 of the fixed metal frame 141A, in some cases.

Moreover, factors, such as excessively large thickness of mortar applied around a nozzle hole 202 of the plate 2, hardening of the mortar, or dust adhered to the plate 2, can become an obstacle when the plate 2 is inserted into the fixed metal frame 141A.

In the fourth embodiment, the above problems can be solved by vibrating the plate 2 using the vibration mechanism 19 to vibrationally move the plate 2 within the fixed metal frame 141A. More specifically, the plate 2 is vibrated during the operation of inserting the plate 2 into the fixed metal frame 141A, so that the plate 2 can be finely displaced, and thereby becomes more likely to contact the first inclined surfaces 72 of the holding blocks 71 and to be fitted into the side of the second inclined surface 73. Further, the plate 2 is vibrated when the plate 2 is brought into contact with the fixed metal frame 141A, so that the plate 2 can be finely displaced, and thereby the fitting recesses 212 thereof become more likely to be fitted on the fitting protrusions 146 of the fixed metal frame 141A. Further, the plate 2 can be vibrated to fluidize the mortal, thereby preventing the mortar from becoming an obstacle to insertion of the plate 2 into the fixed metal frame 141A. Further, before inserting the plate 2 into the fixed metal frame 141A, the plate 2 can be vibrated to remove dust adhered thereto.

Although the above problems have been described in connection with the fixed metal frame 141A, it should be understood that the swingable metal frame 142A has similar problems.

Although the fourth embodiment has been described in connection with attaching and detaching of the plate 2 of the sliding nozzle device 14A attached to the ladle 11, by using the plate attaching-detaching apparatus 1A, it should be understood that the plate attaching-detaching apparatus 1A according to the fourth embodiment can also be used for attaching and detaching of a plate of a sliding nozzle device provided in a container for receiving molten steel, such as a tundish.

The fourth embodiment has been described based on an example where a plate-receiving metal frame assembly is configured to receive two plates. However, the vibration mechanism 19 can also be used when a plate is inserted into a plate-receiving metal frame assembly configured to receive three plates.

LIST OF REFERENCE SIGNS

1A: plate attaching-detaching apparatus
1, 101, 101A: plate holding device
102: flange
2: plate
201: refractory plate body
202: nozzle hole
203: back plate
204: opening
205: metal band
207: raised portion
209: fixable portion
209a: opening
210: engagement protrusion
210a: outer surface of engagement protrusion
211: corner
212: fitting recess
3: parallel gripper (widening and narrowing means)
31: parallel claw
32: gripper body
33: mounting plate
4: holding member
41: engagement groove
42: inner surface of holding member
5: pressing unit
6, 6A: plate-receiving metal frame (plate-receiving metal frame assembly)
61: guide protrusion
62: recess
7: lock mechanism
71: holding block
72, 73: inclined surface
9, 9A: pressing unit
91: support plate
92: pressing plate
93: bolt
94: coil spring 95: base plate
10: force sensor
11: ladle
111: bottom of lade
12: floor
13: ladle support
14, 14A: sliding nozzle device
141, 141A: fixed metal frame
142, 142A: sliding metal frame (swingable metal frame)
1411, 1421: receiving portion
1412, 1422: outer surface
143: bottom surface
144: pivot shaft
145: spring box
146: fitting protrusion
15: robot arm
16: three-dimensional sensor
16a: camera
16b: laser irradiator
17: control unit
18: pressing mechanism
18a: pressing mechanism body
18b: moving part
18c: contact part
19: vibration mechanism (vibration unit)
19a: vibration mechanism body
19b: vibration applicator

The invention claimed is:

1. A plate attaching-detaching apparatus comprising a robot arm, and a plate holding device, and a control unit for controlling operations of the robot arm and plate holding device, wherein the plate holding device is mounted to a distal end of the robot arm; and
wherein the plate holding device comprises:
a plurality of holding members for holding a plate for a sliding nozzle device;
widening and narrowing means to selectively widen and narrow a distance between the holding members;
a pressing unit for pressing a central region of the plate when the plate is held by the holding members;
a force sensor for detecting a force received by the holding members and/or the pressing unit from the held plate; and
a pressing mechanism for inhibiting a swingable metal frame openable and closable with respect to a fixed metal frame of the sliding nozzle device from being swung in a closing direction,
wherein during a plate detaching operation, the control unit is configured to: controllably operate the robot arm so as to move the plate holding device toward a plate attached to the plate-receiving metal frame; then when the force detected by the force sensor reaches a given threshold, controllably operate the robot arm so as to stop the movement of the plate holding device, and controllably operate the widening and narrowing means so as to narrow the distance between the holding members to hold the plate; and then controllably operate the robot arm so as to detach the held plate from the plate-receiving metal frame; and
wherein during a plate attaching operation, the control unit is configured to: controllably operate the robot arm so as to move a plate held by the plate holding device toward the plate-receiving metal frame; and, then when the force detected by the force sensor reaches a given threshold, controllably operate the robot arm so as to stop the movement of the plate holding device, and controllably operate the widening and narrowing means so as to widen the distance between the holding members to release the plate, thereby attaching the plate to the plate-receiving metal frame.

2. The plate attaching-detaching apparatus of claim 1, wherein each of the holding members is disposed such that a distal end thereof protrudes with respect to a contact part of the pressing mechanism, wherein, in a state in which the holding members are inserted in the swingable metal frame, the contact part of the pressing mechanism is disposed to form a gap with respect to the swingable metal frame.

3. The plate attaching-detaching apparatus of claim 1, wherein the pressing mechanism is movable forwardly and backwardly or extendable and retractable, with respect to the swingable metal frame.

4. The plate attaching-detaching apparatus of claim 1, wherein the pressing mechanism is capable of pressing the swingable metal frame in an open direction.

5. The plate attaching-detaching apparatus of claim 1, wherein the pressing mechanism is configured to, when the holding members hold the plate received in the swingable metal frame, press the swingable metal frame to disengage at least a portion of the plate from the swingable metal frame.

6. The plate attaching-detaching apparatus of claim 1, wherein the pressing mechanism is configured such that, at least during a transition period from a state in which the holding members hold the plate to a state in which an engagement between the plate and the swingable metal frame is released, a contact part of the pressing mechanism continues to contact the swingable metal frame.

7. The plate attaching-detaching apparatus of claim 1, wherein the plate holding device comprises a vibration unit for applying vibration to the held plate.

8. The plate attaching-detaching apparatus of claim 7, wherein the pressing unit is capable of pressing the held plate toward a plate-receiving metal frame of the sliding nozzle plate, and wherein the vibration unit is configured to contact the pressing unit to apply vibration to the held plate through the pressing unit.

9. The plate attaching-detaching apparatus of claim 8, wherein the vibration unit is configured to be activated to vibrate, when the pressing unit presses the held plate.

10. The plate attaching-detaching apparatus of claim 8, wherein, in a state in which the holding members hold a plate for the sliding nozzle device, the pressing unit is disposed between the held plate and the vibration unit.

11. The plate attaching-detaching apparatus of claim 8, which is configured such that, in an operation of fittingly attaching a plate for the sliding nozzle device to the plate-receiving metal frame, the pressing unit starts to press the plate after the holding members release the holding of the plate, and the vibration unit starts to vibrate when the pressing unit starts the pressing of the plate.

12. The plate attaching-detaching apparatus of claim 1,
wherein during a plate attaching operation, the control unit is configured to: controllably operate the robot arm so as to move a plate held by the plate holding device toward the plate-receiving metal frame; then when the force detected by the force sensor reaches a given threshold, controllably operate the robot arm so as to stop the movement of the plate holding device, and controllably operate the widening and narrowing means so as to widen the distance between the holding members to release the plate; and, in a state in which the plate is released, controllably operate the robot arm so as to further move the plate holding device toward the plate-receiving metal frame, and, then when the force detected by the force sensor reaches a given threshold, stop the movement of the plate holding device; and then controllably operate the robot arm so as to move only the plate holding device away from the plate-receiving metal frame, thereby attaching the plate to the plate-receiving metal frame.

\* \* \* \* \*